US009204149B2

(12) United States Patent
Ramachandran et al.

(10) Patent No.: US 9,204,149 B2
(45) Date of Patent: Dec. 1, 2015

(54) MOTION REFINEMENT ENGINE WITH SHARED MEMORY FOR USE IN VIDEO ENCODING AND METHODS FOR USE THEREWITH

(75) Inventors: Avinash Ramachandran, Toronto (CA); Edward Hong, North York (CA); Gang Qiu, Richmond Hill (CA); Xu Gang Zhao, Toronto (CA); Xinghai Li, North York (CA)

(73) Assignee: ViXS Systems, Inc., Toronto (CA)

( * ) Notice: Subject to any disclaimer, the term of this patent is extended or adjusted under 35 U.S.C. 154(b) by 2856 days.

(21) Appl. No.: 11/602,942

(22) Filed: Nov. 21, 2006

(65) Prior Publication Data

US 2008/0117974 A1 May 22, 2008

(51) Int. Cl.
*H04N 11/02* (2006.01)
*H04N 11/04* (2006.01)
*H04N 19/119* (2014.01)
*H04N 19/64* (2014.01)
*H04N 19/63* (2014.01)
*H04N 19/66* (2014.01)
*H04N 19/30* (2014.01)
(Continued)

(52) U.S. Cl.
CPC ........... *H04N 19/119* (2014.11); *H04N 19/127* (2014.11); *H04N 19/147* (2014.11); *H04N 19/15* (2014.11); *H04N 19/176* (2014.11); *H04N 19/30* (2014.11); *H04N 19/523* (2014.11); *H04N 19/53* (2014.11); *H04N 19/567* (2014.11); *H04N 19/61* (2014.11); *H04N 19/63* (2014.11); *H04N 19/647* (2014.11); *H04N 19/66* (2014.11)

(58) Field of Classification Search
None
See application file for complete search history.

(56) References Cited

U.S. PATENT DOCUMENTS 5,576,767 A * 11/1996 Lee et al. ................. 375/240.14
6,011,870 A * 1/2000 Jeng et al. ..................... 382/236
(Continued)

FOREIGN PATENT DOCUMENTS

| CN | 1830214 A | 9/2006 |
| EP | 1339234 A2 | 8/2003 |
| EP | 1610561 A2 | 12/2005 |

OTHER PUBLICATIONS

Partial European Search Report; EP Application No. 07254535.3; Feb. 6, 2012; 6 pages.

*Primary Examiner* — Frederick Bailey
*Assistant Examiner* — Edemio Navas, Jr.
(74) *Attorney, Agent, or Firm* — Garlick & Markison; Bruce E. Stuckman

(57) ABSTRACT

A motion compensation module can be used in a video encoder for encoding a video input signal that includes a sequence of images that are segmented into a plurality of macroblocks. The motion compensation module includes a shared memory and a motion search module that generates a motion search motion vector for a plurality of subblocks for a plurality of partitionings of a macroblock of a plurality of macroblocks and generates a selected group of the plurality of partitionings and stores the selected group of partitionings and the corresponding motion search motion vectors in the shared memory. A motion refinement module retrieves the selected group of partitionings and the corresponding motion search motion vectors from the shared memory, that generates a refined motion vector for the plurality of subblocks for the selected group of the plurality of partitionings of the macroblock of the plurality of macroblocks, based on the motion search motion vector for each of the plurality of subblocks of the macroblock of the plurality of macroblocks.

15 Claims, 16 Drawing Sheets

(51) Int. Cl.
*H04N 19/176* (2014.01)
*H04N 19/147* (2014.01)
*H04N 19/15* (2014.01)
*H04N 19/61* (2014.01)
*H04N 19/127* (2014.01)
*H04N 19/53* (2014.01)
*H04N 19/523* (2014.01)
*H04N 19/567* (2014.01)

(56) References Cited

U.S. PATENT DOCUMENTS

| | | | |
|---|---|---|---|
| 6,671,319 B1 * | 12/2003 | Chang et al. | 375/240.16 |
| 6,990,148 B2 * | 1/2006 | Yang | 375/240.16 |
| 7,362,808 B2 * | 4/2008 | Kang | 375/240.16 |
| 7,720,154 B2 * | 5/2010 | Zhou et al. | 375/240.16 |
| 7,852,916 B2 * | 12/2010 | Duvivier | 375/240 |
| 2005/0053132 A1 * | 3/2005 | Caball et al. | 375/240.11 |
| 2005/0226332 A1 * | 10/2005 | Uetani | 375/240.16 |
| 2005/0265454 A1 | 12/2005 | Muthukrishnan et al. | |
| 2005/0286635 A1 * | 12/2005 | Kumar et al. | 375/240.16 |
| 2006/0002474 A1 * | 1/2006 | Au et al. | 375/240.16 |
| 2006/0056719 A1 | 3/2006 | Yu et al. | |
| 2006/0222075 A1 | 10/2006 | Zhang et al. | |
| 2007/0002948 A1 | 1/2007 | Shibahara et al. | |
| 2007/0121724 A1 * | 5/2007 | Van Zon et al. | 375/240.16 |
| 2008/0056354 A1 * | 3/2008 | Sun et al. | 375/240.12 |
| 2008/0232473 A1 * | 9/2008 | Marquant et al. | 375/240.16 |
| 2009/0168883 A1 * | 7/2009 | Lu et al. | 375/240.16 |
| 2009/0304080 A1 * | 12/2009 | Francois et al. | 375/240.15 |

* cited by examiner

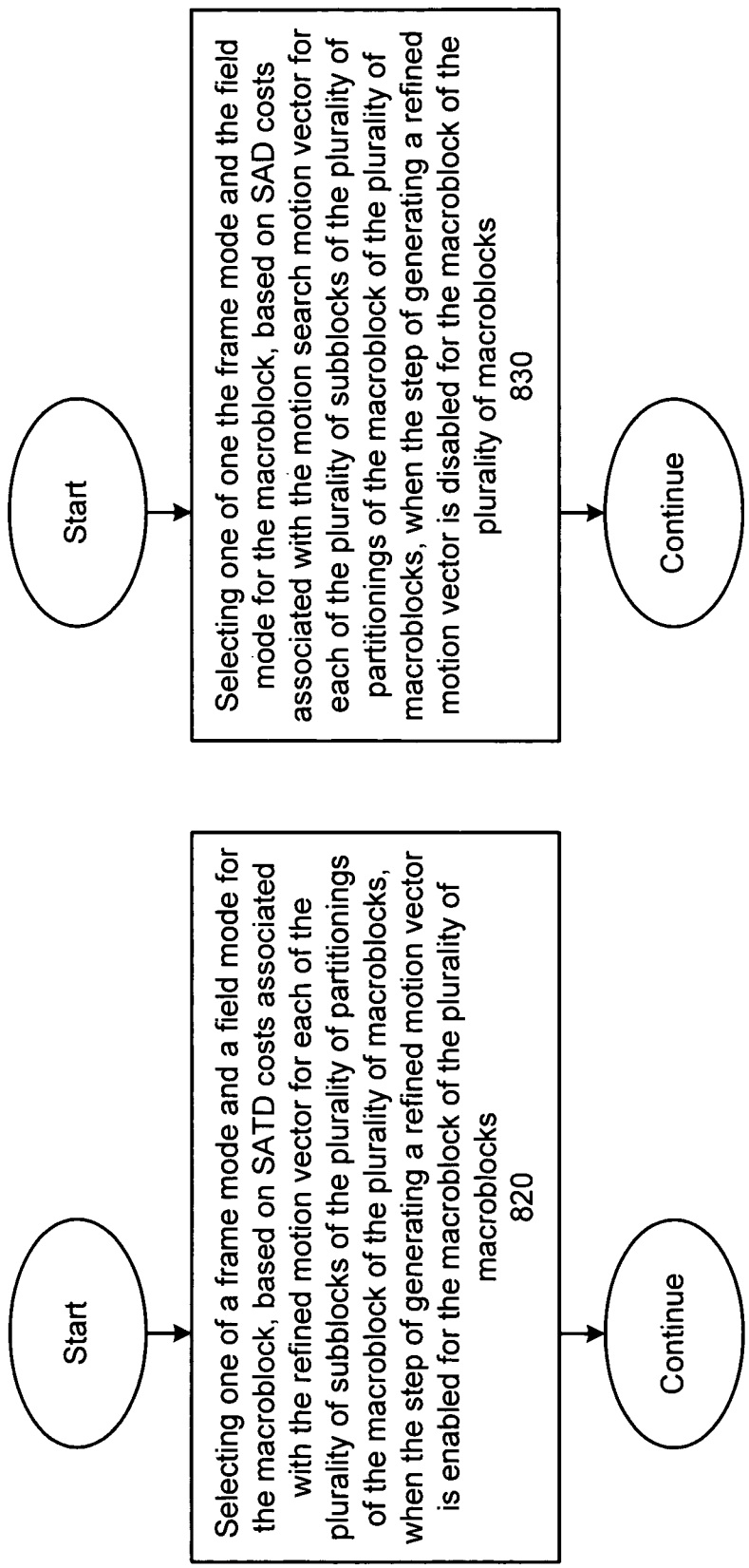

MOTION REFINEMENT ENGINE WITH SHARED MEMORY FOR USE IN VIDEO ENCODING AND METHODS FOR USE THEREWITH

CROSS REFERENCE TO RELATED PATENTS

The present application is related to the following U.S. patent applications that are commonly assigned:

MOTION REFINEMENT ENGINE FOR USE IN VIDEO ENCODING IN ACCORDANCE WITH A PLURALITY OF COMPRESSION STANDARDS AND METHODS FOR USE THEREWITH, having Ser. No. 11/602,936, filed Nov. 21, 2006, issued as U.S. Pat. No. 8,290,045 on Oct. 16, 2012;

MOTION REFINEMENT ENGINE WITH SELECTABLE PARTITIONINGS FOR USE IN VIDEO ENCODING AND METHODS FOR USE THEREWITH, having Ser. No. 11/602,768, filed Nov. 21, 2006;

MOTION REFINEMENT ENGINE WITH A PLURALITY OF COST CALCULATION METHODS FOR USE IN VIDEO ENCODING AND METHODS FOR USE THEREWITH, having Ser. No. 11/602,731, filed Nov. 21, 2006, issued as U.S. Pat. No. 8,218,636 on Jul. 10, 2012;

the contents of which are expressly incorporated herein in their entirety by reference thereto.

TECHNICAL FIELD OF THE INVENTION

The present invention relates to encoding used in devices such as video encoders/codecs.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 18 presents a flowchart representation of a method in accordance with an embodiment of the present invention.

FIG. 19 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
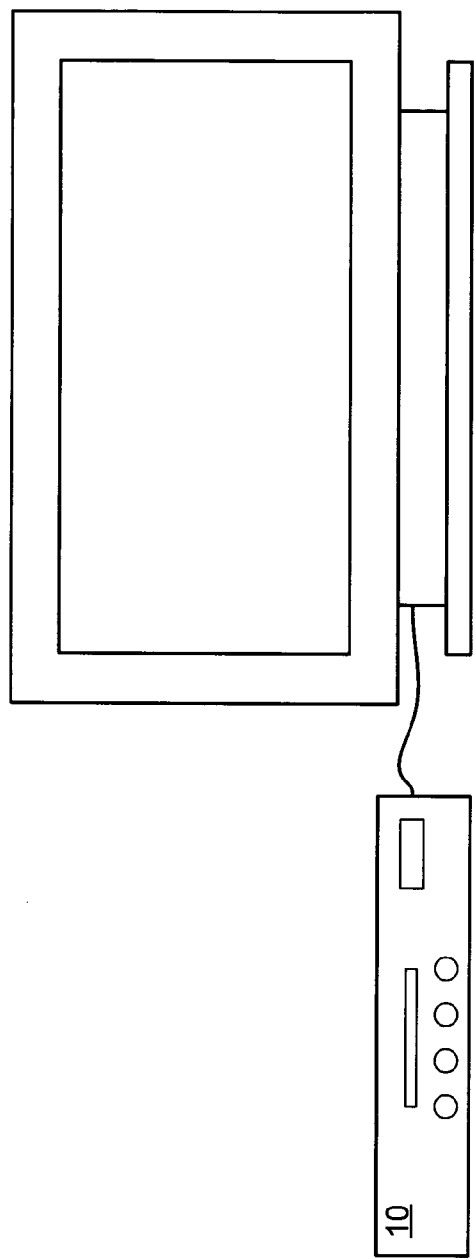
FIGS. 1-3 present pictorial diagram representations of a various video processing devices in accordance with embodiments of the present invention.
Figure 3:
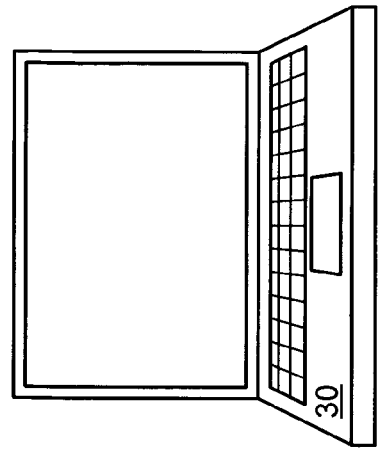
Figure 2:
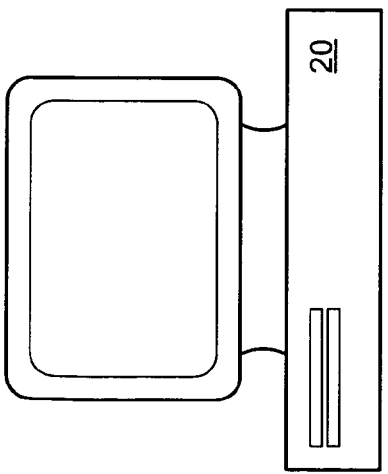

FIGS. 1-3 present pictorial diagram representations of a various video processing devices in accordance with embodiments of the present invention. In particular, set top box 10 with built-in digital video recorder functionality or a stand alone digital video recorder, computer 20 and portable computer 30 illustrate electronic devices that incorporate a video processing device 125 that includes one or more features or functions of the present invention. While these particular devices are illustrated, video processing device 125 includes any device that is capable of encoding video content in accordance with the methods and systems described in conjunction with FIGS. 4-19 and the appended claims.

Figure 4:
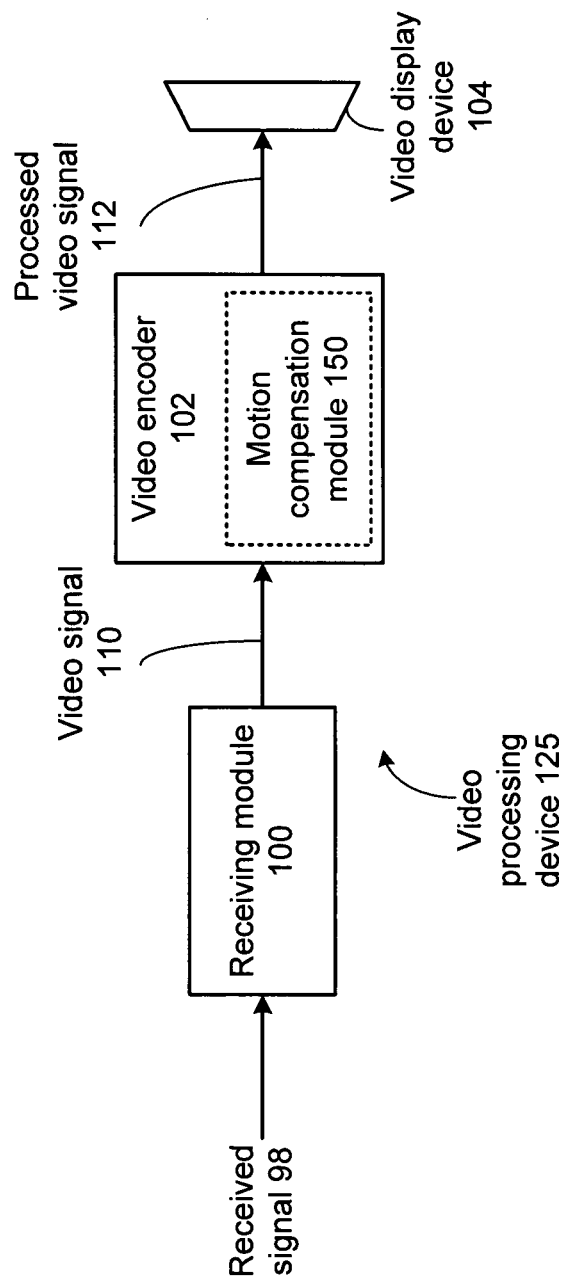
FIG. 4 presents a block diagram representation of a video processing device 125 in accordance with an embodiment of the present invention.

FIG. 4 presents a block diagram representation of a video processing device 125 in accordance with an embodiment of the present invention. In particular, video processing device 125 includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video encoder 102 is coupled to the receiving module 100 to encode or transcode the video signal in a format corresponding to video display device 104.

In an embodiment of the present invention, the received signal 98 is a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal includes 112 a digital video codec standard such as H.264, MPEG-4 Part 10 Advanced Video Coding (AVC) or other digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Video encoder 102 includes a motion compensation module 150 that operates in accordance with the present invention and, in particular, includes many optional functions and features described in conjunction with FIGS. 5-19 that follow.

Figure 5:
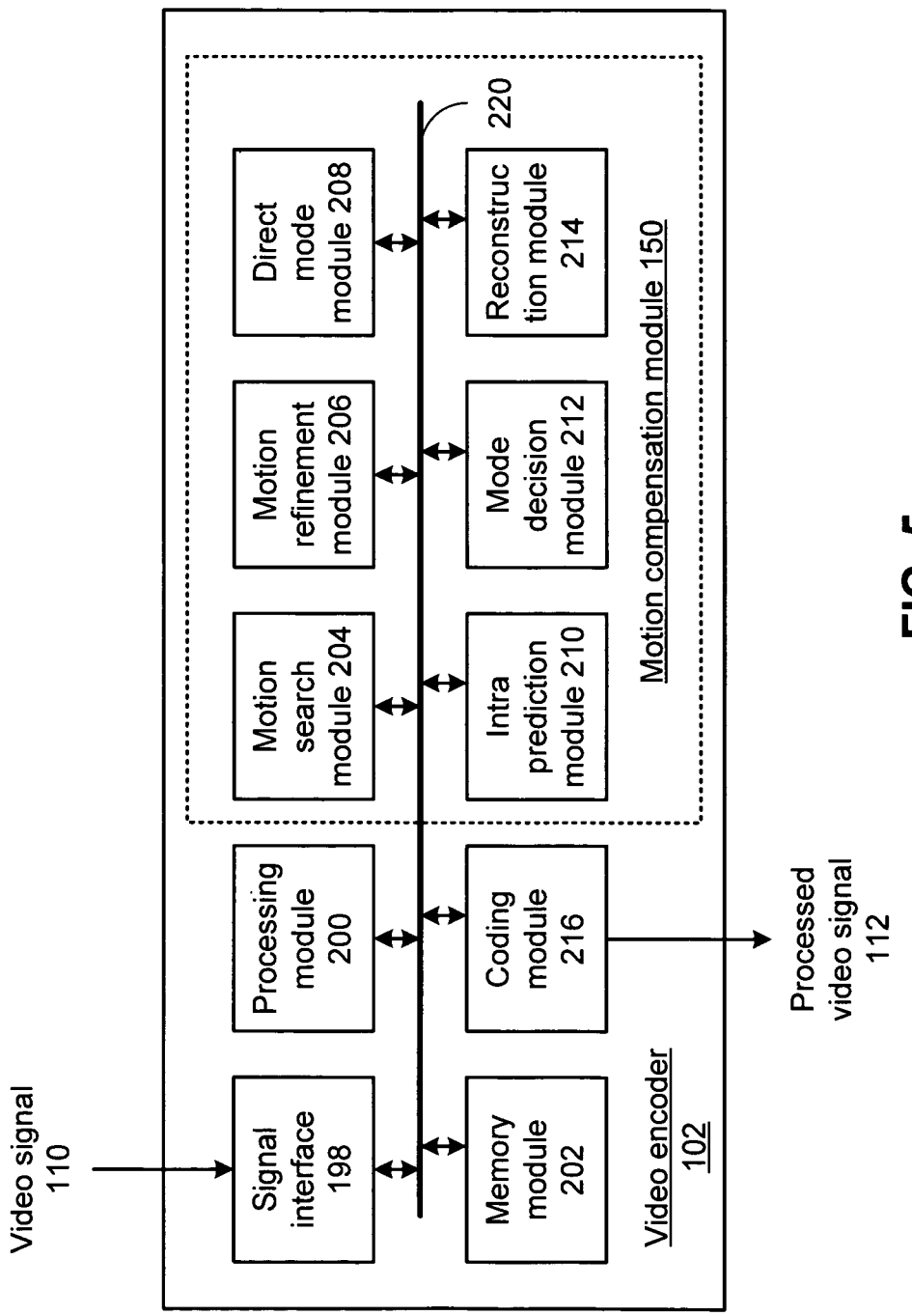
FIG. 5 presents a block diagram representation of a video encoder 102 that includes motion search module 204, motion refinement module 206 and mode decision module 212 in accordance with an embodiment of the present invention.

FIG. 5 presents a block diagram representation of a video encoder 102 that includes motion search module 204, motion refinement module 206 and mode decision module 212 in accordance with an embodiment of the present invention. In particular, video encoder 102 operates in accordance with many of the functions and features of the H.264 standard, the MPEG-4 standard, VC-1 (SMPTE standard 421M) or other standard, to encode a video input signal 110 that is converted to a digital format via a signal interface 198.

The video encoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 220, to the signal interface 198 and a plurality of other modules, such as motion search module 204, motion refinement module 206, direct mode module 208, intra-prediction module 210, mode decision module 212, reconstruction module 214, entropy coding module 216, neighbor management module 218, forward transform and quantization module 220 and deblocking filter module 222. The modules of video encoder 102 can be implemented in software, firmware or hardware, depending on the particular implementation of processing module 200. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Motion compensation module 150 includes a motion search module 204 that processes pictures from the video input signal 110 based on a segmentation into macroblocks of pixel values, such as of 16 pixels by 16 pixels size, from the columns and rows of a frame and/or field of the video input signal 110. In an embodiment of the present invention, the motion search module determines, for each macroblock or macroblock pair of a field and/or frame of the video signal one or more motion vectors (depending on the partitioning of the macroblock into subblocks as described further in conjunction with FIG. 7) that represents the displacement of the macroblock (or subblock) from a reference frame or reference field of the video signal to a current frame or field. In operation, the motion search module operates within a search range to locate a macroblock (or subblock) in the current frame or field to an integer pixel level accuracy such as to a resolution of 1-pixel. Candidate locations are evaluated based on a cost formulation to determine the location and corresponding motion vector that have a most favorable (such as lowest) cost.

In an embodiment of the present invention, a cost formulation is based on the sum of the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video input signal or an estimated predicted motion vector that is determined based on motion vectors from neighboring current macroblocks of a prior row of the video input signal. In addition, the cost calculation avoids the use of neighboring subblocks within the current macroblock. In this fashion, motion search module 204 is able to operate on a macroblock to contemporaneously determine the motion search motion vector for each subblock of the macroblock.

A motion refinement module 206 generates a refined motion vector for each macroblock of the plurality of macroblocks, based on the motion search motion vector. In an embodiment of the present invention, the motion refinement module determines, for each macroblock or macroblock pair of a field and/or frame of the video input signal 110, a refined motion vector that represents the displacement of the macroblock from a reference frame or reference field of the video signal to a current frame or field. In operation, the motion refinement module refines the location of the macroblock in the current frame or field to a greater pixel level accuracy such as to a resolution of ¼-pixel. Candidate locations are also evaluated based on a cost formulation to determine the location and refined motion vector that have a most favorable (such as lowest) cost. As in the case with the motion search module, a cost formulation is based on the a sum of the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video input signal or an estimated predicted motion vector that is determined based on motion vectors from neighboring current macroblocks of a prior row of the video input signal. In addition, the cost calculation avoids the use of neighboring subblocks within the current macroblock. In this fashion, motion refinement module 206 is able to operate on a macroblock to contemporaneously determine the motion search motion vector for each subblock of the macroblock.

In addition motion search module 202 or motion refinement module 204 is operable to determine a skip mode cost of the P Slices of video input signal 110 by evaluating a cost associated with a stationary motion vector, and by skipping portions of motion search and/or motion refinement if the skip mode cost compares favorably to a skip mode threshold.

It should be noted that when estimated predicted motion vectors are used, the cost formulation avoids the use of motion vectors from the current row and both the motion search module 204 and the motion refinement module 206 can operate in a pipelined fashion and in parallel on an entire row of video input signal 110, to contemporaneously determine the refined motion vector for each macroblock in the row.

A direct mode module 208 generates a direct mode motion vector for each macroblock of the plurality of macroblocks, based on a plurality of macroblocks that neighbor the macroblock of pixels. In an embodiment of the present invention, the direct mode module 208 operates to determine the direct mode motion vector and the cost associated with the direct mode motion vector based on the cost for the direct mode motion vectors for the B slices of video input signal 110, such as in a fashion defined by the H.264 standard.

While the prior modules have focused on inter-prediction of the motion vector, intra-prediction module 210 generates a best intra prediction mode for each macroblock of the plurality of macroblocks. In particular, intra-prediction module 210 operates in a fashion such as defined by the H.264 standard to evaluate a plurality of intra prediction modes, based on motion vectors determined from neighboring macroblocks to determine the best intra prediction mode and the associated cost.

A mode decision module 212 determines a final motion vector for each macroblock of the plurality of macroblocks based on costs associated with the refined motion vector, the direct mode motion vector, and the best intra prediction mode, and in particular, the method that yields the most favorable (lowest) cost, or otherwise an acceptable cost. A reconstruction module 214 completes the motion compensation by generating residual luma and/or chroma pixel values corresponding to the final motion vector for each macroblock of the plurality of macroblocks.

A forward transform and quantization module 220 of video encoder 102 generates processed video signal 112 by transforming coding and quantizing the residual pixel values into quantized transformed coefficients that can be further coded, such as by entropy coding in entropy coding module 216, filtered by de-blocking filter module 222 and transmitted and/or stored as the processed video signal 112.

As discussed above, many of the modules of motion compensation module 150 operate based on motion vectors determined for neighboring macroblocks. Neighbor management module 218 generates and stores neighbor data for at least one macroblock of the plurality of macroblocks for retrieval by at least one of the motion search module 204, the motion refinement module 206, the direct mode module 208, intra-prediction module 210, entropy coding module 216 and deblocking filter module 222, when operating on at least one neighboring macroblock of the plurality of macroblocks. As the motion vector (or the plurality of motion vectors in the case of macroblock partitioning, discussed further in conjunction with FIGS. 7 and 8) and the other encoding data are finalized, neighboring data is stored for use in the processing of neighboring macroblocks that have yet to be processed, yet that will require the use of such data. In addition, neighboring data is also stored for the processing of future pictures, such as future frames and/or fields of video input signal 110.

In an embodiment of the present invention, a data structure, such as a linked list, array or one or more registers are used to associate and store neighbor data for each macroblock. Neighbor data includes motion vectors, reference indices, quantization parameters, coded-block patterns, macroblock types, intra/inter prediction module types neighboring pixel values and or other data from neighboring macroblocks and/or subblocks used to by one or more of the modules or procedures of the present invention to calculate results for a current macroblock. For example, in order to determine the predicated motion vector for the motion search module 204 and motion refinement module 206, both the motion vectors and reference index of neighbors are required. In addition to these data, the direct mode module 208 requires the motion vectors of the co-located macroblock of previous reference pictures. The deblocking filter module 222 operates according to a set of filtering strengths determined by using the neighbors' motion vectors, quantization parameters, reference index, and coded-block-patterns, etc. For entropy coding in entropy coding module 216, the motion vector differences (MVD), macroblock types, quantization parameter delta, inter predication type, etc. are required.

Consider the example where a particular macroblock MB(x,y) requires neighbor data from macroblocks MB(x−1, y−1), MB(x, y−1), MB (x+1,y−1) and MB(x−1,y). In prior art codecs, the preparation of the neighbor data needs to calculate the location of the relevant neighbor sub-blocks. However, the calculation is not as straightforward as it was in conventional video coding standards. For example, in H.264 coding, the support of multiple partition types make the size and shape for the subblocks vary significantly. Furthermore, the support of the macroblock adaptive frame and field (MBAFF) coding allows the macroblocks to be either in frame or in field mode. For each mode, one neighbor derivation method is defined in H.264. So the calculation needs to consider each mode accordingly. In addition, in order to get all of the neighbor data required, the derivation needs to be invoked four times since there are four neighbors involved—MB(x−1, y−1), MB(x, y−1), MB(x+1, y−1), and MB(x−1, y). So the encoding of the current macroblock MB(x, y) cannot start not until the location of the four neighbors has been determined and their data have been fetched from memory.

The present invention avoids the above problems. In particular when each macroblock is processed and final motion vectors and encoded data are determined, neighbor data is stored in data structures for each neighboring macroblock that will need this data. Since the neighbor data is prepared in advance, the current macroblock MB(x,y) can start right away when it is ready to be processed. The burden of pinpointing neighbors is virtually re-allocated to its preceding macroblocks. The encoding of macroblocks can be therefore be more streamline and faster. In other words, when the final motion vectors are determined for MB(x−1,y−1), neighbor data is stored for each neighboring macroblock that is yet to be processed, including MB(x,y) and also other neighboring macroblocks such as MB(x, y−1), MB(x−2,y) MB(x−1,y). Similarly, when the final motion vectors are determined for MB(x,y−1), MB(x+1,y−1) and MB(x−1,y) neighbor data is stored for each neighboring macroblock corresponding to each of these macroblocks that are yet to be processed, including MB(x,y). In this fashion, when MB(x,y) is ready to be processed, the neighbor data is already stored in a data structure that corresponds to this macroblock for fast retrieval.

The motion compensation can then proceed using the retrieved data. In particular, the motion search module 204 and/or the motion refinement module, can generate at least one predicted motion vector (such as a standard PMV or estimated predicted motion vector) for each macroblock of the plurality of macroblocks using retrieved neighbor data. Further, the direct mode module 208 can generate at least one direct mode motion vector for each macroblock of the plurality of macroblocks using retrieved neighbor data and the intra-prediction module 210 can generates the best intra prediction mode for each macroblock of the plurality of macroblocks using retrieved neighbor data, and the coding module 216 can use retrieved neighbor data in entropy coding, each as set forth in the H.264 standard, the MPEG-4 standard, VC-1 (SMPTE standard 421M) or by other standard or other means.

While not expressly shown, video encoder 102 can include a memory cache, a memory management module, a comb filter or other video filter, and/or other module to support the encoding of video input signal 110 into processed video signal 112.

Figure 6:
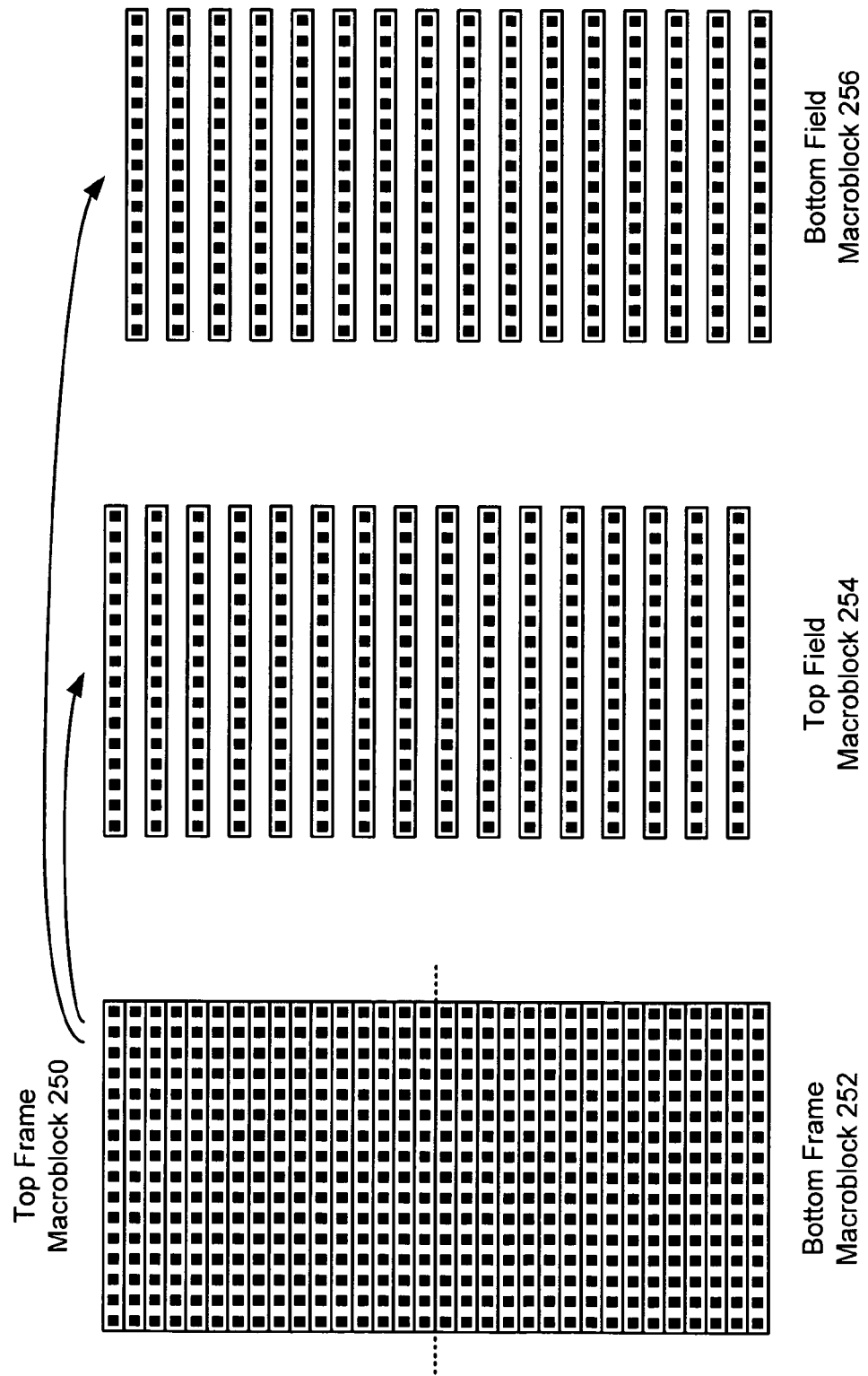
FIG. 6 presents a graphical representation of the relationship between example top frame and bottom frame macroblocks (250, 252) and example top field and bottom field macroblocks (254, 256) in accordance with an embodiment of the present invention.

FIG. 6 presents a graphical representation of the relationship between example top frame and bottom frame macroblocks (250, 252) and example top field and bottom field macroblocks (254, 256) in accordance with an embodiment of the present invention. In this embodiment, motion search module 204 generates a motion search motion vector for each macroblock of a plurality of macroblocks by contemporaneously evaluating a macroblock pair that includes a top frame macroblock 250 and bottom frame macroblock 252 from a frame of the video input signal 110 and a top field macroblock 254 and a bottom field macroblock 256 from corresponding fields of the video input signal 110.

Considering the example shown, each of the macroblocks are 16 pixels by 16 pixels in size. Motion search is performed in full pixel resolution, or other resolution, either coarser or finer, by comparing a candidate frame macroblock pair of a current frame that includes top frame macroblock 250 and bottom frame macroblock 252 to the macroblock pair of a reference frame. In addition, lines of a first parity (such as odd lines) from the candidate frame macroblock pair are grouped to form top field macroblock 254. Similarly, lines of a second parity (such as even lines) from the candidate frame macroblock pair are grouped to form bottom field macroblock 256. Motion search module 204 calculates a cost associated a plurality of lines, and generates a cost associated with the top frame macroblock 250 based on a cost accumulated for a plurality of top lines of the plurality of lines, generates a cost associated with the bottom frame macroblock 252 based on a cost accumulated for a plurality of bottom lines of the plurality of lines, generates a cost associated with the top field macroblock 254 based on a cost accumulated for a plurality of first-parity lines of the plurality of lines compared with either a top or bottom field reference, and generates a cost associated with the bottom field macroblock 256 based on a cost accumulated for a plurality of second-parity lines of the plurality of lines, also based on either a top or bottom field reference. In this fashion, six costs can be generated contemporaneously for the macroblock pair: top frame compared with top frame of the reference; bottom frame compared with the bottom frame of the reference; top field compared with top field of the reference; bottom field compared with the bottom field of the reference; top field compared with bottom field of the reference; and bottom field compared with the top field of the reference.

Each of these costs can be generated based on the sum of the absolute differences (SAD) of the pixel values of the current frame or field with the reference frame or field. The SADs can be calculated contemporaneously, in a single pass, based on the accumulation for each line. The overall SAD for a particular macroblock (top or bottom, frame or field) can be determined by totaling the SADs for the lines that make up that particular macroblock. Alternatively, the SADs can be calculated in a single pass, based on the smaller segments such as 4×1 segments that can be accumulated into subblocks, that in turn can be accumulated into overall macroblock totals. This alternative arrangement particularly lends itself to motion search modules that operate based on the partitioning of macroblocks into smaller subblocks, as will be discussed further in conjunction with FIG. 7.

The motion search module 204 is particularly well adapted to operation in conjunction with macroblock adaptive frame and field processing. Frame mode costs for the current macroblock pair can be generated as discussed above. In addition, motion search module 204 optionally generates a field decision based on accumulated differences, such as SAD, between the current bottom field macroblock and a bottom field macroblock reference, the current bottom field macroblock and a top field macroblock reference, the current top field macroblock and the bottom field macroblock reference, and the current top field macroblock and the top field macroblock reference. The field decision includes determining which combination (top/top, bottom/bottom) or (top/bottom, bottom/top) yields a lower cost. Similarly, motion search module 204 can optionally choose either frame mode or field mode for a particular macroblock pair, based on whether the frame mode cost compares more favorably (e.g. are lower) or less favorably (e.g. higher) to the field mode cost, based on the field mode decision. In addition, other modules of motion compensation module 150 that operate on both frames and field can operate can similarly operate.

In particular, the neighbor management module 218 generates neighbor data that includes frame below neighbor data for retrieval by a neighboring macroblock in a row below the at least one macroblock when processing in frame mode and field below neighbor data for retrieval by the neighboring macroblock in a row below the at least one macroblock when processing in field mode. In addition, the neighbor data includes frame right neighbor data for retrieval by a neighboring macroblock to the right of the at least one macroblock when processing in field mode and field right neighbor data for retrieval by the neighboring macroblock to the right of the at least one macroblock when processing in field mode. In this fashion, the motion search module and other modules of motion compensation module 150 that operate using neighbor data and that can operate in either a frame or field mode can directly access either the frame mode neighbor data for frame mode neighbors above the macroblock of interest, the field mode neighbor data for field mode neighbors above the macroblock of interest, the frame mode neighbor data for the frame mode neighbor to the left of the macroblock of interest and/or the field mode neighbor data for the field mode neighbor to the left of the macroblock of interest. As before, this information is stored in the processing of the prior macroblocks, whether the macroblocks themselves were processed in frame or in field mode, and can be accessed in the processing of the macroblock of interest by retrieval directly from memory and without a look-up table or further processing.

Figure 7:
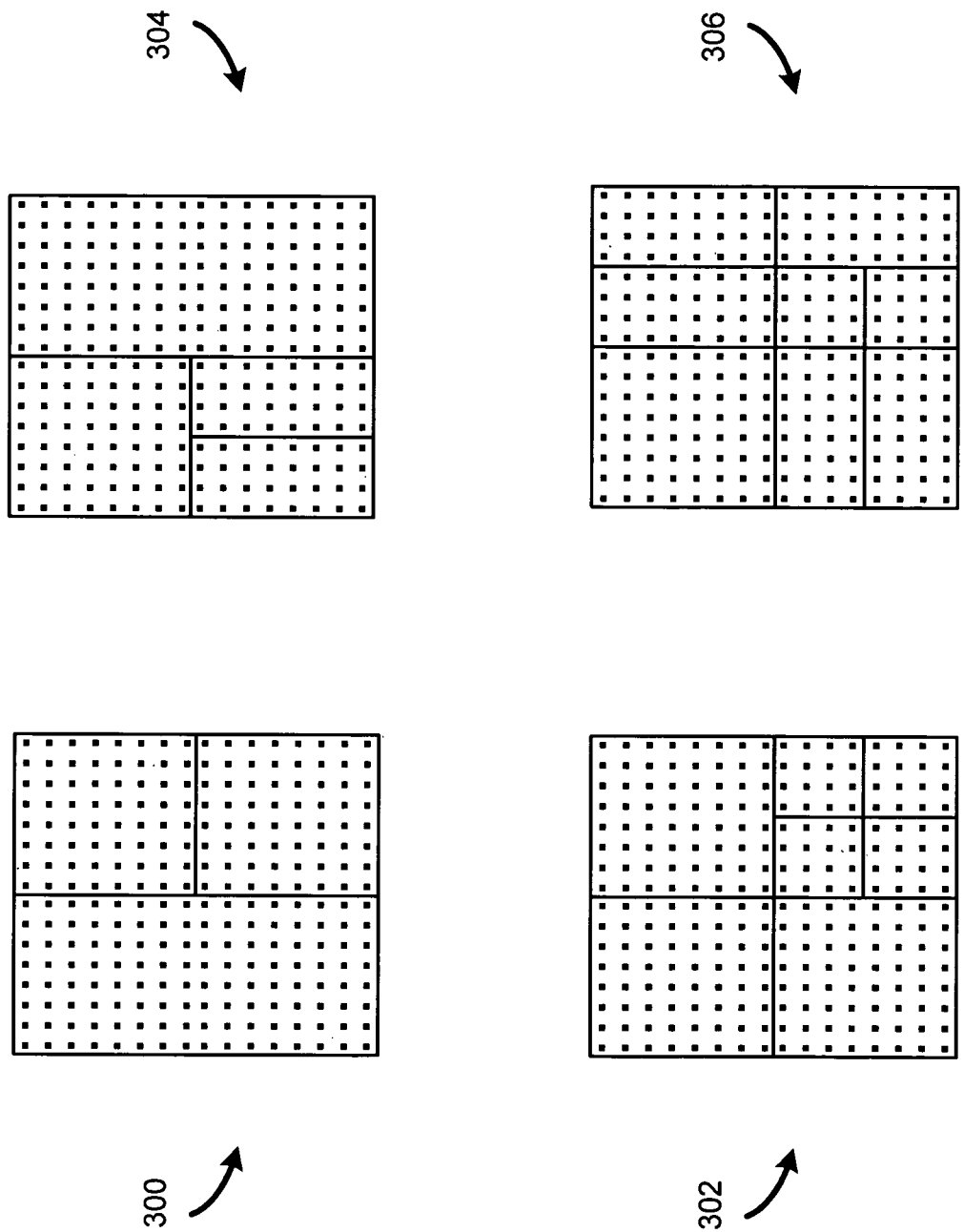
FIG. 7 presents a graphical representation that shows example macroblock partitioning in accordance with an embodiment of the present invention.

FIG. 7 presents a graphical representation of example partitionings of a macroblock of a video input signal into a plurality of subblocks. In particular, while the modules described in conjunction with FIG. 5 above can operate on macroblocks having a size such as 16 pixels×16 pixels, such as in accordance with the H.264 standard, macroblocks can be partitioned into subblocks of smaller size, as small as 4 pixels on a side with the functions and features described in conjunction with the macroblocks applying to each subblock with individual pixel locations indicated by dots. For example, motion search module 204 can generate separate motion search motion vectors for each subblock of each macroblock, etc.

Macroblock 302 represents an example of partitioning into subblocks in accordance with the H.264 standard. Macroblocks 300, 304 and 306 represent examples of other possible partitioning into subblocks. In particular, macroblock 300 is a 16×16 macroblock that is partitioned into an 8×16 subblock and two 8×8 subblocks. Macroblock 302 is a 16×16 macroblock that is partitioned into three 8×8 subblocks and four 4×4 subblocks. Macroblock 304 is a 16×16 macroblock that is partitioned into an 8×16 subblock, an 8×8 subblock and two 4×8 subblocks. Macroblock 306 is a 16×16 macroblock that is partitioned into an 8×8 subblock, three 4×8 subblocks, two 8×4 subblocks, and two 4×4 subblocks. The partitioning of the macroblocks into smaller subblocks increases the complexity of the motion compensation by requiring various compensation methods, such as the motion search to determine, not only the motion search motion vectors for each subblock, but the best motion vectors over the set of all possible partitions of a particular macroblock. The result however can yield more accurate motion compensation and reduced compression artifacts in the decoded video image.

Figure 8:
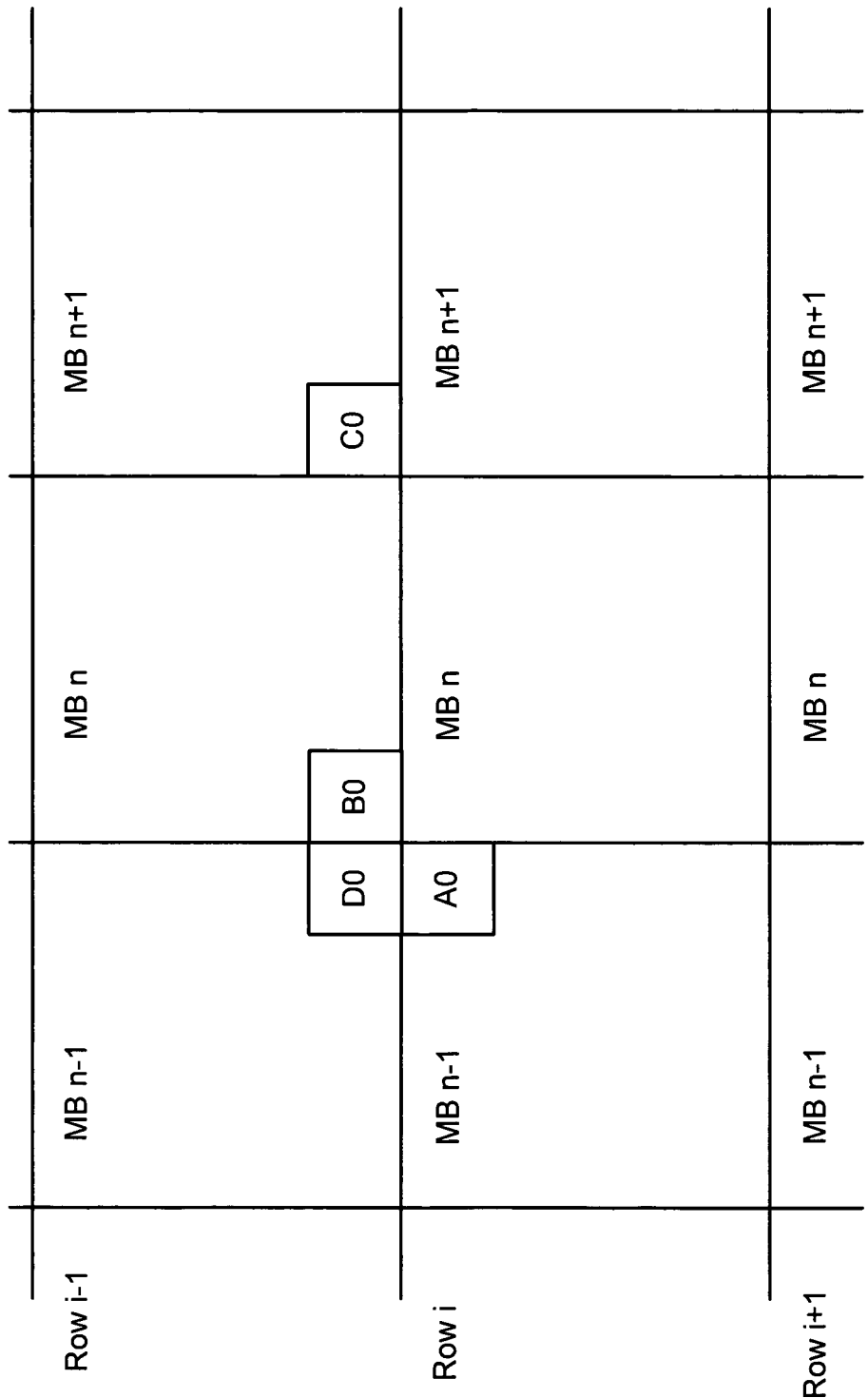
FIG. 8 presents a graphical representation of a plurality of macroblocks of a video input signal that shows an example of the neighboring macroblocks used in motion compensation or encoding of a particular macroblock.

FIG. 8 presents a graphical representation of a plurality of macroblocks of a video input signal that shows an example of the neighboring macroblocks used in motion compensation or encoding of a particular macroblock. Three macroblocks MB n−1, MB n and MB n+1 are show for three rows, row i−1, row i and row i+1 of a video input signal in either frame or field mode. The dots representing individual pixel locations have been omitted for clarity.

Consider for example, that video encoder 102 is operating on macroblock MB(n, i). Consider further, that the motion refinement module 206, motion search module 204, direct mode module 208, the intra-prediction module 210 and coding module 216 may need the final motion vectors determined for 4×4 subblock D0 from MB(n−1, i−1), subblock B0 from MB(n, i−1), subblock C0 from MB(n+1, i−1), along with subblock A0 from MB(n−1, i). When MB(n−1, i−1) is processed, the motion vector for D0 is stored in a data structure associated with MB(n, i), along with the other neighbor data for other neighbors such as MB(n, i−1), MB(n−2, i) and MB(n−1, i). When MB(n, i−1) is processed, the motion vector for B0 is stored in a data structure associated with MB(n, i) along with the other neighbor data for other neighbors. When MB(n+1, i−1) is processed, the motion vector for C0 is stored in a data structure associated with MB(n, i) along with the other neighbor data for other neighbors. And when MB(n−1, i) is processed, the motion vector for D0 is stored in a data structure associated with MB(n, i) along with the other neighbor data for other neighbors. In this fashion, when MB (n, i) is processed, any of the necessary neighbor data can be easily retrieved from the data structure.

While the above discussion relates to the processing in either frame of field mode, as discussed in conjunction with FIG. 6, both frame and field mode neighbor data can be stored for later retrieval, as needed, in the processing of neighboring macroblocks. Further, while the above discussion focuses on individual macroblocks, neighbor data based on the processing or macroblock pairs can also be stored, with, for instance, neighbor data used by the bottom macroblock that is derived from the top macroblock within the macroblock pair being generated directly in the processing of the macroblock pair.

Figure 9:
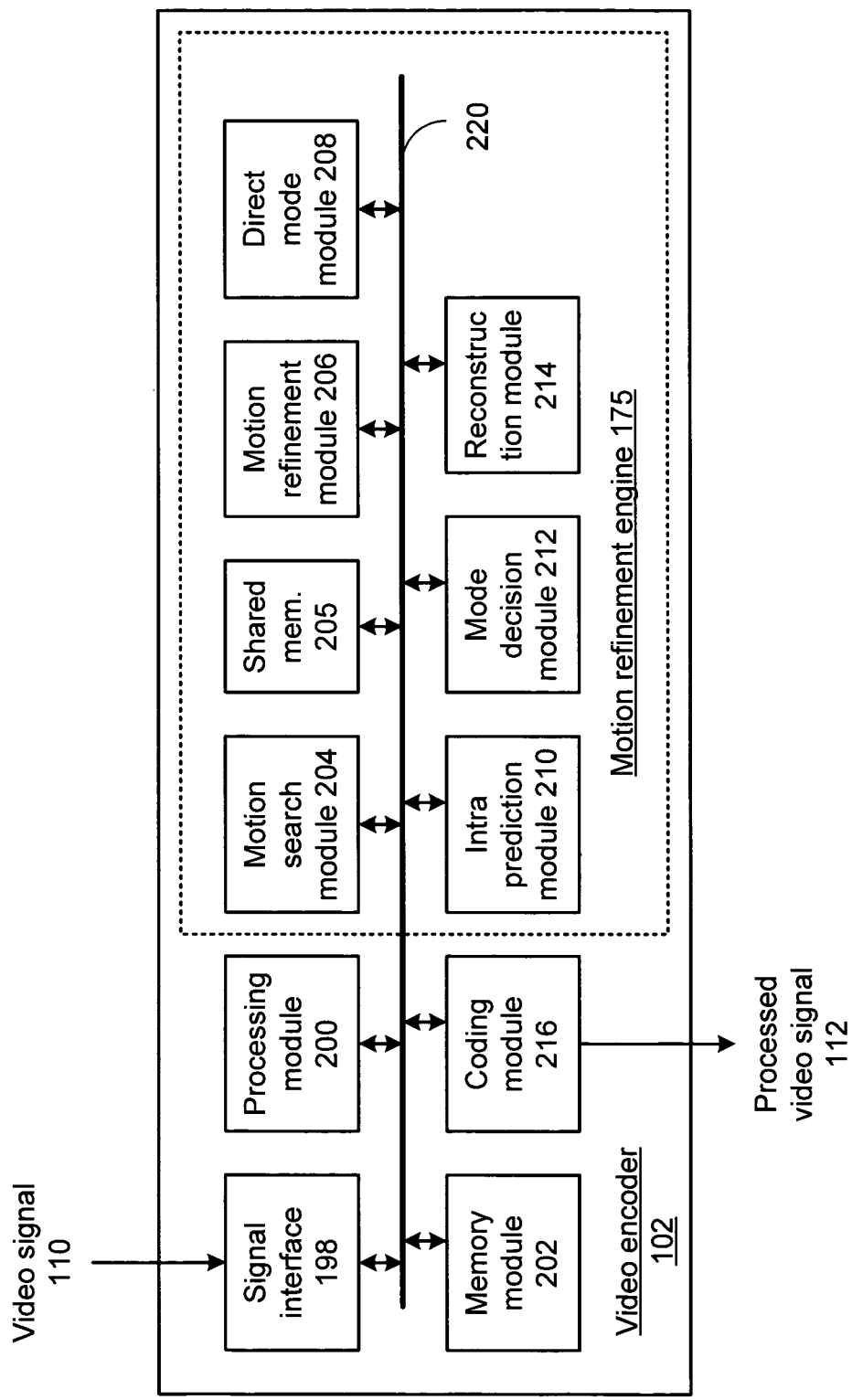
FIG. 9 presents a block diagram representation of a video encoder 102 that includes motion refinement engine 175 in accordance with an embodiment of the present invention.

FIG. 9 presents a block diagram representation of a video encoder 102 that includes motion refinement engine 175 in accordance with an embodiment of the present invention. In addition to modules referred to by common reference numerals that have been previously described, motion refinement engine 175 includes a shared memory 205 that can be implemented separately from, or part of, memory module 202. In addition, motion refinement engine 175 can be implemented in a special purpose hardware configuration that has a very generic design capable of handling sub-pixel search using different reference pictures—either frame or field and either forward in time, backward in time or a blend between forward and backward. Motion refinement engine 175 can operate in a plurality of compression modes to support a plurality of different compression algorithms such as H.264, MPEG-4, VC-1, etc. in an optimized and single framework. Reconstruction can be performed for chroma only, luma only or both chroma and luma.

For example, the capabilities these compression modes can include:

H.264:
1. Motion search and refinement on all large partitions into subblocks of size (16×16), (16×8), (8×16) and (8×8) for forward/backward and blended directions when MBAFF is ON. This also includes field and frame MB types.
2. Motion search and refinement on all partitions into subblocks of size (16×16), (16×8), (8×16) and (8×8), and subpartitions into subblocks of size (8×8), (8×4), (4×8), and (4×4) for forward/backward and blended directions when MBAFF is OFF.
3. Computation of direct mode and/or skip mode cost for MBAFF ON and OFF.
4. Mode decision is based on all the above partitions for MBAFF ON and OFF. The chroma reconstruction for the corresponding partitions is implicitly performed when the luma motion reconstruction is invoked.
5. Motion refinement and compensation include quarter pixel accurate final motion vectors using the 6 tap filter algorithms of the H.264 standard.

VC-1:
1. Motion search and refinement for both 16×16 and 8×8 partitions for both field and frame cases for forward, backward and blended directions.
2. Mode decision is based on each of the partitions above. This involves the luma and corresponding chroma reconstruction.
3. Motion refinement and compensation include bilinear half pixel accurate final motion vectors of the VC-1 standard.

MPEG-4:
  1. Motion search and refinement for both 16×16 and 8×8 partitions for both field and frame cases for forward, backward and blended directions.
  2. Mode decision is based on all of the partitions above. Reconstruction involves the luma only.
  3. Motion refinement and compensation include bilinear half pixel accurate MVs of the VC-1 standard.

Further, motion refinement engine 175 can operate in two basic modes of operation (1) where the operations of motion refinement module 206 are triggered by and/or directed by software/firmware algorithms included in memory module 202 and executed by processing module 200; and (2) where operations of motion refinement module 206 are triggered by the motion search module 204, with little or no software/firmware intervention. The first mode operates in accordance with one or more standards, possibly modified as described herein. The second mode of operation can be dynamically controlled and executed more quickly, in an automated fashion and without a loss of quality.

Shared memory 205 can be individually, independently and contemporaneously accessed by motion search module 204 and motion refinement module 206 to facilitate either the first or second mode of operation. In particular, shared memory 205 includes a portion of memory, such as a cost table that stores results (such as motion vectors and costs) that result from the computations performed by motion search module 204. This cost table can include a plurality of fixed locations in shared memory where these computations are stored for later retrieval by motion refinement module 206, particularly for use in the second mode of operation. In addition, to the cost table, the shared memory 205 can also store additional information, such as a hint table, that tells the motion refinement module 206 and the firmware of the decisions it makes for use in either mode, again based on the computations performed by motion search module 204. Examples include: identifying which partitions are good, others that are not as good and/or can be discarded; identifying either frame mode or field mode as being better and by how much; and identifying which direction, amongst forward, backward and blended is good and by how much, etc.

The motion search module may terminate its computations early based on the results it obtains. In any case, motion search can trigger the beginning of motion refinement directly by a trigger signal sent from the motion search module 204 to the motion refinement module 206. Motion refinement module 206 can, based on the data stored in the hint table and/or the cost table, have the option to refine only particular partitions, a particular mode (frame or field), and/or a particular direction (forward, backward or blended) that either the motion search module 204 or the motion refinement module 206 determines to be good based on a cost threshold or other performance criteria. In the alternative, the motion refinement module can proceed directly based on software/firmware algorithms in a more uniform approach. In this fashion, motion refinement engine 175 can dynamically and selectively operate so as to complete the motion search and motion refinement, pipelined and in parallel, such that the refinement is performed for selected partitions, all the subblocks for a single partition, group of partitions or an entire MB/MB pair on both a frame and field basis, on only frame or field mode basis, and for forward, backward and blended directions of for only a particular direction, based on the computations performed by the motion search module 204.

In operation, motion search module 204 contemporaneously generates a motion search motion vector for a plurality of subblocks for a plurality of partitionings of a macroblock of a plurality of MB/MB pairs. Motion refinement module 206, when enabled, contemporaneously generates a refined motion vector for the plurality of subblocks for the plurality of partitionings of the MB/MB pairs of the plurality of macroblocks, based on the motion search motion vector for each of the plurality of subblocks of the macroblock of the plurality of macroblocks. Mode decision module selects a selected partitioning of the plurality of partitionings, based on costs associated with the refined motion vector for each of the plurality of subblocks of the plurality of partitionings, of the macroblock of the plurality of macroblocks, and determines a final motion vector for each of the plurality of subblocks corresponding to the selected partitioning of the macroblock of the plurality of macroblocks. Reconstruction module 214 generates residual pixel values, for chroma and/or luma, corresponding to a final motion vector for the plurality of subblocks of the macroblock of the plurality of macroblocks.

Further, the motion search module 204 and the motion refinement module 206 can operate in a plurality of other selected modes including a mode corresponding to a first compression standard, a mode corresponding to a second compression standard and/or a mode corresponding to a third compression standard, etc. and wherein the plurality of partitionings can be based on the selected mode. For instance, in one mode, the motion search module 204 and the motion refinement module 206 are capable of operating with macroblock adaptive frame and field (MBAFF) enabled when a MBAFF signal is asserted and with MBAFF disabled when the MBAFF enable signal is deasserted, and wherein the plurality of partitionings are based on the MBAFF enable signal. In an embodiment, when the MBAFF signal is asserted, the plurality of partitionings of the macroblock partition the macroblock into subblocks having a first minimum dimension of sizes 16 pixels by 16 pixels, 16 pixels by 8 pixels, 8 pixels by 16 pixels, and 8 pixels by 8 pixels—having a minimum dimension of 8 pixels. Further, when the MBAFF signal is deasserted, the plurality of partitionings of the macroblock partition the macroblock into subblocks having a second minimum dimension of sizes 16 pixels by 16 pixels, 16 pixels by 8 pixels, 8 pixels by 16 pixels, 8 pixels by 8 pixels, 4 pixels by 8 pixels, 8 pixels by 4 pixels, and 4 pixels by 4 pixels—having a minimum dimension of 4 pixels. In other modes of operation, the plurality of partitionings of the macroblock partition the macroblock into subblocks of sizes 16 pixels by 16 pixels, and 8 pixels by 8 pixels. While particular macroblock dimensions are described above, other dimensions are likewise possible with the broader scope of the present invention.

In addition, to the partitionings of the MB/MB pairs being based on the particular compression standard employed, motion search module 204 can generate a motion search motion vector for a plurality of subblocks for a plurality of partitionings of a macroblock of a plurality of macroblocks and generate a selected group of the plurality of partitionings based on a group selection signal. Further, motion refinement module 206 can generate the refined motion vector for the plurality of subblocks for the selected group of the plurality of partitionings of the macroblock of the plurality of macroblocks, based on the motion search motion vector for each of the plurality of subblocks of the macroblock of the plurality of macroblocks. In this embodiment, the group selection signal can be used by the motion search module 204 to selectively apply one or more thresholds to narrow down the number of partitions considered by motion refinement module 206 in order to speed up the algorithm.

For example, when the group selection signal has a first value, the motion search module 204 determines the selected group of the plurality of partitionings by comparing, for the plurality of partitionings of the macroblock of the plurality of macroblocks, the accumulated the costs associated with the motion search motion vector for each of the plurality of subblocks with a first threshold, and assigning the selected group to be a partitioning with the accumulated cost that compares favorably to the first threshold. In this mode, if a particular partitioning is found that generates a very good cost, the motion search module 204 can terminate early for the particular macroblock and motion refinement module 206 can operate, not on the entire set of partitionings, but on the particular partitioning that generates a cost that compares favorably to the first threshold.

Further, when the group selection signal has a second value, the motion search module 204 determines the selected group of the plurality of partitionings by comparing, for the plurality of partitionings of the macroblock of the plurality of macroblocks, the accumulated the costs associated with the motion search motion vector for each of the plurality of subblocks and assigning the selected group to be the selected partitioning with the most favorable accumulated cost. Again, motion refinement module 206 can operate, not on the entire set of partitionings, but on the particular partitioning that generates the most favorable cost from the motion search.

In addition, when the group selection signal has a third value, the motion search module 204 determines the selected group of the plurality of partitionings by comparing, for the plurality of partitionings of the macroblock of the plurality of macroblocks, the accumulated the costs associated with the motion search motion vector for each of the plurality of subblocks with a second threshold, and assigning the selected group to be each of partitionings of the plurality of partitionings with accumulated cost that compares favorably to the second threshold. In this mode, motion refinement module 206 can operate, not on the entire set of partitionings, but only on those partitionings that generate a cost that compares favorably to the second threshold.

As discussed above, the motion search module 204 and motion refinement module 206 can be pipelined and operate to contemporaneously generate the motion search motion vector for the plurality of subblocks for a plurality of partitionings of a macroblock of a plurality of macroblocks, in parallel. In addition, shared memory 205 can be closely coupled to both motion search module 204 and motion refinement module 206 to efficiently store the results for selected group of partitionings from the motion search module 204 for use by the motion refinement module 206. In particular, motion search module 204 stores the selected group of partitionings and the corresponding motion search motion vectors in the shared memory and other results in the cost and hint tables. Motion refinement module 206 retrieves the selected group of partitionings and the corresponding motion search motion vectors from the shared memory. In a particular embodiment, the motion search module 204 can generate a trigger signal in response to the storage of the selected group of partitionings of the macroblock and the corresponding motion search motion vectors and/or other results in the shared memory, and the motion refinement module 206 can commence the retrieval of the selected group of partitionings and the corresponding motion search motion vectors and/or other results from the shared memory in response to the trigger signal.

As discussed above, the motion refinement for a particular macroblock can be turned off by selectively disabling the motion refinement module for a particular application, compression standard, or for a particular macroblock, such as when, in a skip mode where the cost associated with the stationary motion vector compares favorably to a skip mode cost threshold or if the total cost associated with a particular partitioning compares favorably to a skip refinement cost threshold, wherein the motion search motion vector can be used in place of the refined motion vector. In yet another optional feature, the motion search module 204 generates a motion search motion vector for a plurality of subblocks for a plurality of partitionings of a macroblock of a plurality of macroblocks based one or several costs calculations such as on a sum of accumulated differences (SAD) cost, as previously discussed. However, motion refinement module 206, when enabled, generates a refined motion vector for the plurality of subblocks for the plurality of partitionings of the macroblock of the plurality of macroblocks, based on the motion search motion vector for each of the plurality of subblocks of the macroblock of the plurality of macroblocks based on a sum of accumulated transform differences (SATD) cost. In this case, the mode decision module 212 must operate on either SAD costs from the motion search module 204 or based on SATD costs from the motion refinement module 206.

In particular, mode decision module 212 is coupled to the motion refinement module 206 and the motion search module 204. When the motion refinement module 206 is enabled for the macroblock of the plurality of macroblocks, the mode decision module 212 selects a selected partitioning of the plurality of partitionings, based on SATD costs associated with the refined motion vector for each of the plurality of subblocks of the plurality of partitionings of the macroblock of the plurality of macroblocks. In addition, when the motion refinement module 206 is disabled for the macroblock of the plurality of macroblocks, mode decision module 212 selects a selected partitioning of the plurality of partitionings, based on SAD costs associated with the motion search motion vector for each of the plurality of subblocks of the plurality of partitionings of the macroblock of the plurality of macroblocks, and that determines a final motion vector for each of the plurality of subblocks corresponding to the selected partitioning of the macroblock of the plurality of macroblocks.

Since the motion refinement engine 175 can operate in both a frame or field mode, mode decision module 212 selects one of a frame mode and a field mode for the macroblock, based on SATD costs associated with the refined motion vector for each of the plurality of subblocks of the plurality of partitionings of the macroblock of the plurality of macroblocks, or based on SAD costs associated with the motion search motion vector for each of the plurality of subblocks of the plurality of partitionings of the macroblock of the plurality of macroblocks.

In an embodiment of the present invention, the motion refinement engine 175 is designed to work through a command FIFO located in the shared memory 205. The functional flexibilities of the engine are made possible with a highly flexible design of the command FIFO. The command FIFO has four 32-bit registers, of which one of them is the trigger for the motion refinement engine 175. It could be programmed so as to complete the motion refinement/compensation for a single partition, group of partitions or an entire MB/MB pair, with or without MBAFF, for forward, backward and blended directions with equal ease. It should be noted that several bits are reserved to support future features of the present invention.

In a particular embodiment, the structure of the command FIFO is as summarized in the table below.

| Field Name | Bit Position | Description |
| --- | --- | --- |
| TASK | 1:0 | 0 = Search/refine<br>1 = Direct<br>2 = Motion Compensation/Reconstruction<br>3 = Decode |
| DIRECTION | 4:2 | Bit 0: FWD<br>Bit 1: BWD<br>Bit 2: Blended |
| WRITE_COST | 5 | 0 = Don't write out Cost<br>1 = Write out Cost |
| PARTITIONS | 51:6 | Which partitions to turn on and off. This is interpreted in accordance with a MBAFF Flag |
| TAG | 58:52 | To tag the Index FIFO entry - 7 bits |
| DONE | 59 | Generate Interrupt when finished this entry |
| PRED_DIFF_INDEX | 63:60 | Which Predicted and Difference Index to write to |
| CURR_Y_MB_INDEX | 67:64 | Which Current Y MB Index to read from |
| CURR_C_MB_INDEX | 71:68 | Which Current C MB Index to read from |
| FWD_INDEX | 75:72 | FWD Command Table Index to parse through |
| BWD_INDEX | 79:76 | BWD Command Table Index to parse through |
| BLEND_INDEX | 83:80 | BLEND Command Table Index to write to |
| Reserved | 84 | |
| THRESHOLD_ENABLE | 85 | Perform Refinement only for the partitions indicated by the threshold table. |
| BEST_MB_PARTITION | 86 | Use only the Best Macroblock partition. This will ignore the PARTITIONS field in this index FIFO entry |
| Reserved | 87 | |
| DIRECT_TOP_FRM_FLD_SEL | 89:88 | 00: None, 01: Frame, 10: Field, 11: Both |
| DIRECT_BOT_FRM_FLD_SEL | 91:90 | 00: None, 01: Frame, 10: Field, 11: Both |
| WRITE_PRED_PIXELS | 93:92 | 0 = Don't write out Predicted Pixels<br>1 = Write out Top MB Predicted Pixels<br>2 = Write out Bottom MB Predicted Pixels<br>3 = Write out both Top and Bottom MB Predicted Pixels (turned on for the last entry of motion compensation) |
| WRITE_DIFF_PIXELS | 95:94 | 0 = Don't Write out Difference Pixels<br>1 = Write out Top MB Difference Pixels<br>2 = Write out Bottom MB Difference Pixels<br>3 = Write out both Top and Bottom MB Predicted Pixels (Note: In Motion Compensation Mode, this will write out the Motion Compensation Pixels and will be turned on for the last entry of motion compensation) |
| CURR_MB_X | 102:96 | Current X coordinate of Macroblock |
| Reserved | 103 | |
| CURR_MB_Y | 110:104 | Current Y coordinate of Macroblock |
| Reserved | 111 | |
| LAMBDA | 118:112 | Portion of weighted for cost |
| Reserved | 121:119 | |
| BWD_REF_INDEX | 124:122 | Backward Reference Index |
| FWD_REF_INDEX | 127:125 | Forward Reference Index |

In addition to the Command FIFO, there are also some slice level registers in the shared memory that the motion refinement engine 175 uses. These include common video information like codec used, picture width, picture height, slice type, MBAFF Flag, SATD/SAD flag and the like. By appropriately programming the above bits, the following flexibilities/scenarios could be addressed:

1. The task bits define the operation to be performed by the motion refinement engine 175. By appropriately combining this with the codec information in the registers, the motion refinement engine 175 can perform any of the above tasks for all the codecs as listed earlier.
2. The direction bits refer to the reference picture that needs to be used and are particularly useful in coding B Slices. Any combination of these 3 bits could be set for any of the tasks. By enabling all these 3 bits for refinement, the motion refinement engine 175 can complete motion refinement for the entire MB in all three directions in one call. However, the motion refinement engine 175 can also could select any particular direction and perform refinement only for that (as might be required in P slices). The command FIFO, thus offers the flexibility to address both cases of a single, all-directions call or multiple one-direction calls.
3. The partitions bits are very flexible in their design as they holistically cater to motion refinement and reconstruction for all partitions and sub partitions. By effectively combining these bits with the direction bits, the motion refinement engine 175 can achieve both the extremes i.e. perform refinement for all partitions for all the directions in one shot or perform refinement/compensation for a select set of partitions in a particular direction. The partition bits are also dynamically interpreted differently by the motion refinement engine 175 engine based on the MBAFF ON flag in the registers. Thus, using an optimized, limited set of bits, the motion refinement engine 175 can address an exhaustive scenario of partition combinations. The structure of the partition bits for each of these modes is summarized in the tables that follow for frame (FRM), field (FLD) and direct mode (DIRECT) results.

MBAFF ON:

| Macroblock | Partition | Frm/Fld | Bit |
|---|---|---|---|
| TOP MB | 16 × 16 | FRM | 0 |
|  |  | FLD | 1 |
|  |  | DIRECT | 2 |
|  | 16 × 8 Top Partition | FRM | 3 |
|  |  | FLD | 4 |
|  | 16 × 8 Bottom Partition | FRM | 5 |
|  |  | FLD | 6 |
|  | 8 × 16 Left Partition | FRM | 7 |
|  |  | FLD | 8 |
|  | 8 × 16 Right Partition | FRM | 9 |
|  |  | FLD | 10 |
|  | 8 × 8 Top Left Partition | FRM | 11 |
|  |  | FLD | 12 |
|  |  | DIRECT | 13 |
|  | 8 × 8 Top Right Partition | FRM | 14 |
|  |  | FLD | 15 |
|  |  | DIRECT | 16 |
|  | 8 × 8 Bottom Left Partition | FRM | 17 |
|  |  | FLD | 18 |
|  |  | DIRECT | 19 |
|  | 8 × 8 Bottom Right Partition | FRM | 20 |
|  |  | FLD | 21 |
|  |  | DIRECT | 22 |
| BOT MB | 16 × 16 | FRM | 23 |
|  |  | FLD | 24 |
|  |  | DIRECT | 25 |
|  | 16 × 8 Top Partition | FRM | 26 |
|  |  | FLD | 27 |
|  | 16 × 8 Bottom Partition | FRM | 28 |
|  |  | FLD | 29 |
|  | 8 × 16 Left Partition | FRM | 30 |
|  |  | FLD | 31 |
|  | 8 × 16 Right Partition | FRM | 32 |
|  |  | FLD | 33 |
|  | 8 × 8 Top Left Partition | FRM | 34 |
|  |  | FLD | 35 |
|  |  | DIRECT | 36 |
|  | 8 × 8 Top Right Partition | FRM | 37 |
|  |  | FLD | 38 |
|  |  | DIRECT | 39 |
|  | 8 × 8 Bottom Left Partition | FRM | 40 |
|  |  | FLD | 41 |
|  |  | DIRECT | 42 |
|  | 8 × 8 Bottom Right Partition | FRM | 43 |
|  |  | FLD | 44 |
|  |  | DIRECT | 45 |

MBAFF OFF:

| | Partition | | Bit |
|---|---|---|---|
| FRAME | 16 × 16 | Enable | 0 |
|  |  | DIRECT | 1 |
|  | 16 × 8 Top Partition |  | 2 |
|  | 16 × 8 Bottom Partition |  | 3 |
|  | 8 × 16 Left Partition |  | 4 |
|  | 8 × 16 Right Partition |  | 5 |
|  | 8 × 8 Top Left Partition | 8 × 8 | 6 |
|  |  | 8 × 4 | 7 |
|  |  | 4 × 8 | 8 |
|  |  | 4 × 4 | 9 |
|  |  | DIRECT | 10 |
|  | 8 × 8 Top Right Partition | 8 × 8 | 11 |
|  |  | 8 × 4 | 12 |
|  |  | 4 × 8 | 13 |
|  |  | 4 × 4 | 14 |
|  |  | DIRECT | 15 |
|  | 8 × 8 Bottom Left Partition | 8 × 8 | 16 |
|  |  | 8 × 4 | 17 |
|  |  | 4 × 8 | 18 |
|  |  | 4 × 4 | 19 |
|  |  | DIRECT | 20 |
|  | 8 × 8 Bottom Right Partition | 8 × 8 | 21 |
|  |  | 8 × 4 | 22 |
|  |  | 4 × 8 | 23 |
|  |  | 4 × 4 | 24 |
|  |  | DIRECT | 25 |
| Reserved |  |  | 45:26 |

The command FIFO also has early termination strategies, which could be efficiently used to speed up the motion refinement intelligently. These could be used directly in conjunction with the motion search module 204 or with the intervention of the processor 200 to suit the algorithmic needs. These are as follows:

a. BEST MB PARTITION: This is the super fast mode, which chooses only the best mode as indicated by the motion search to perform refinement on. Motion refinement only looks at the particular partition that are in the in the threshold table that are set based on the motion search results for the BEST partition only one frame or field.

b. THRESHOLD ENABLE: This flag is used to enable the usage of the threshold information in a motion search MS Stats Register. If this bit is ON, the motion refinement engine 175 performs refinement ONLY for the modes specified in the threshold portion of the MS Stats Register. This bit works as follows. For each of the Top/Bottom, Frame/Field MBs, do the following:

If any of the partition bits (any of 16×16, 16×8, 8×16, 8×8) are enabled in the threshold portion of the MS Stats Register (this means that thresholds have been met for those partitions), do all those enabled partitions irrespective of the PARTITION bits in the Command FIFO. For the MBAFF OFF case, when the 8×8 bit is set, refinement is done ONLY for the best sub partition as specified in a hint table for each of the 8×8 partitions. Motion refinement only looks at particular partitions that are in the threshold table that are set based on the motion search results for those partitions that meet the threshold.

Figure 10:
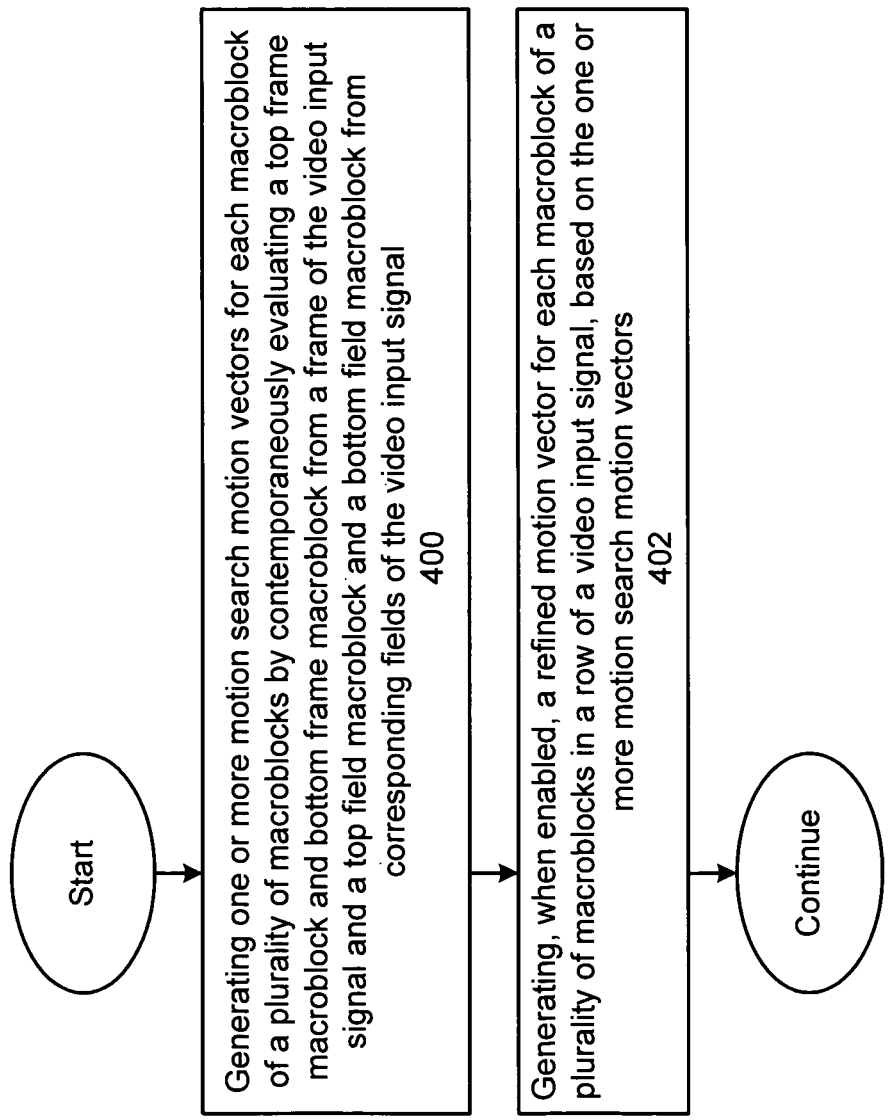
FIG. 10 presents a flowchart representation of a method in accordance with an embodiment of the present invention.

FIG. 10 presents a flowchart representation of a method in accordance with an embodiment of the present invention. In particular, a method is presented for use in conjunction with one or more of the features and functions described in association with FIGS. 1-9. In step 300, one or more motion search motion vectors are generated for each macroblock of a plurality of macroblocks by contemporaneously evaluating a top frame macroblock and bottom frame macroblock from a frame of the video input signal and a top field macroblock and a bottom field macroblock from corresponding fields of the video input signal. In step 302, when enabled the step is enabled, a refined motion vector is generated for each macroblock of the plurality of macroblocks, based on the one or more motion search motion vectors.

In an embodiment of the present invention, step 300 calculates a cost associated with the motion search motion vector based on an estimated predicted motion vector that is based exclusively on neighboring macroblocks from at least one prior row of the video input signal. The at least one prior row can include a row above a row of the video input signal that contains the top frame macroblock. In addition, step 300 can evaluates a plurality of partitions of each macroblock of the plurality of macroblocks into a plurality of subblocks and wherein the estimated predicted motion vector used to calculate a cost for one of the plurality of subblocks is used for each of the remaining plurality of subblocks. Further step 300 can compare the cost associated with the plurality of partitions of each macroblock to a cost threshold and that terminates the evaluation if the cost associated with a particular partition of the plurality of partitions compares favorably to the cost threshold.

In an embodiment of the present invention, step 300 calculates a cost associated a plurality of lines, and generates a cost associated with the top frame macroblock based on a cost accumulated for a plurality of top lines of the plurality of lines, generates a cost associated with the bottom frame macroblock based on a cost accumulated for a plurality of bottom lines of the plurality of lines, generates a cost associated with the top field macroblock based on a cost accumulated for a plurality of first-parity lines of the plurality of lines, and generates a cost associated with the bottom field macroblock based on a cost accumulated for a plurality of second-parity lines of the plurality of lines. In addition, step 300 can generate a field decision based on accumulated differences between the bottom field macroblock and a bottom field macroblock reference, the bottom field macroblock and a top field macroblock reference, the top field macroblock and the bottom field macroblock reference, and the top field macroblock and the top field macroblock reference.

In an embodiment of the present invention, step 300 initiates a small search in a small search region centered on a start motion vector, evaluates a cost associated with a plurality of candidate motion search motion vectors within the small search region, compares the cost associated with each with a small search cost threshold and terminates the evaluation when the cost associated with one of the plurality of candidate motion search motion vectors within the small search region compares favorably to the small search cost threshold. In addition, step 300 can generate the motion search vector compares a cost associated with a stationary motion vector to a stationary cost threshold and when, for a particular one of the plurality of macroblocks, the cost associated the stationary motion vector compares favorably to the stationary cost threshold, the step of generating the motion search module disables the step of generating the refined motion vector for the particular one of the plurality of macroblocks, and that assigns the stationary motion vector as the refined motion vector. Further step 300 can initiate a large search in a large search region, larger than the small search region, centered on the start motion vector, evaluates a cost associated with a plurality of candidate motion search motion vectors within the large search region, compares the cost associated with each with a large search cost threshold and terminates the evaluation when the cost associated with one of the plurality of candidate motion search motion vectors within the large search region compares favorably to the large search cost threshold.

Figure 11:
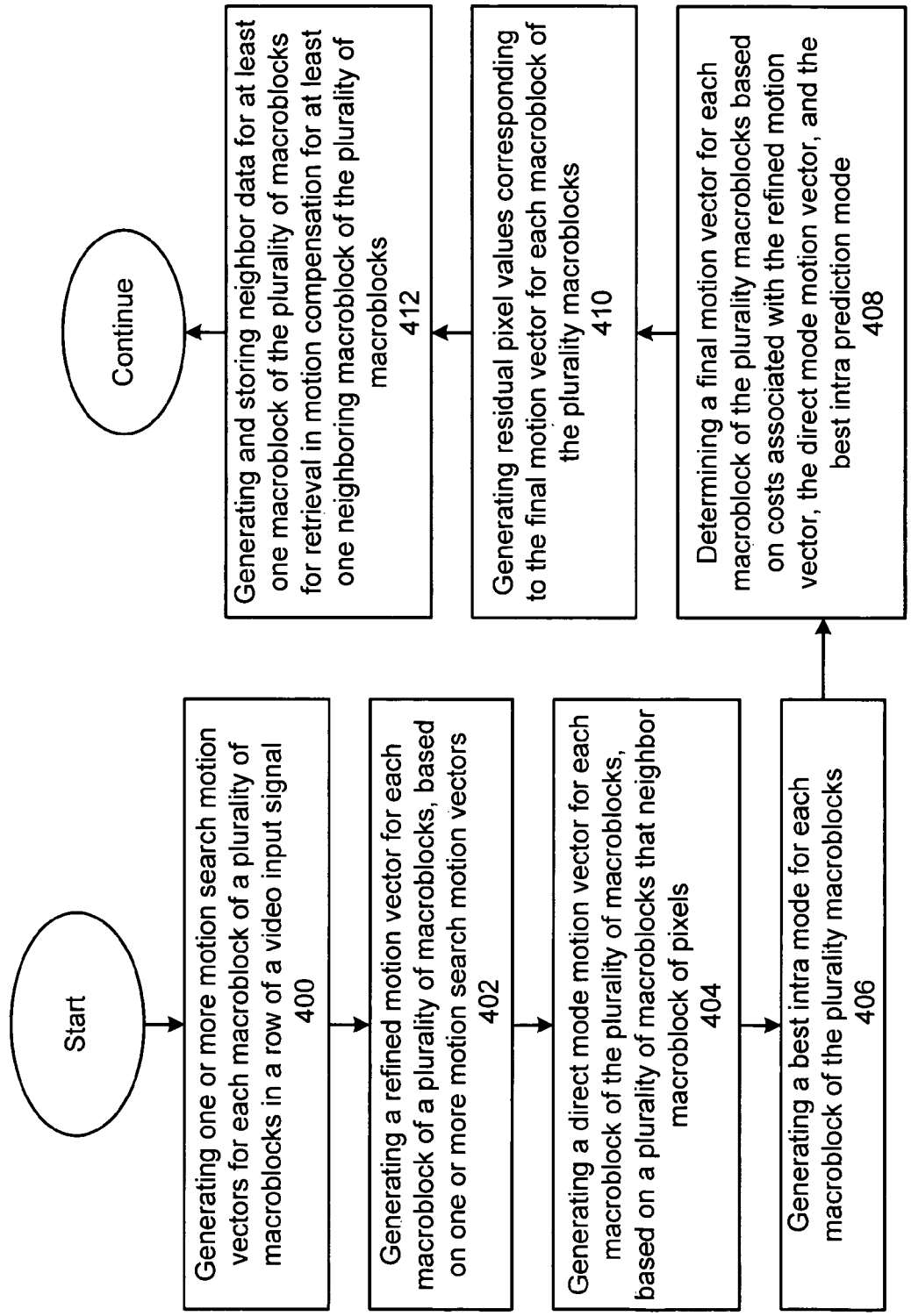
FIG. 11 presents a flowchart representation of a method in accordance with an embodiment of the present invention.

FIG. 11 presents a flowchart representation of a method in accordance with an embodiment of the present invention. In particular, a method is presented for use in conjunction with one or more of the features and functions described in association with FIGS. 1-10. In step 400, one or more motion search motion vectors are generated for each macroblock of a plurality of macroblocks. In step 402, a refined motion vector is generated for each macroblock of the plurality of macroblocks, based on the one or more motion search motion vectors. In step 404, a direct mode motion vector is generated for each macroblock of the plurality of macroblocks, based on a plurality of macroblocks that neighbor the macroblock of pixels. In step 406, a best intra prediction mode is generated for each macroblock of the plurality of macroblocks.

In step 408, a final motion vector is determined for each macroblock of the plurality of macroblocks based on costs associated with the refined motion vector, the direct mode motion vector, and the best intra prediction mode. In step 410, residual pixel values are generated corresponding to the final motion vector for each macroblock of the plurality of macroblocks. In step 412, neighbor data is generated and stored for at least one macroblock of the plurality of macroblocks for retrieval by at least one of the steps of generating a motion search motion vector, generating a refined motion vector, generating a direct mode motion vector, and generating a best intra prediction mode, when operating on at least one neighboring macroblock of the plurality of macroblocks.

In an embodiment of the present invention, steps 400, 402, 404 and/or 406 operate in a macroblock adaptive frame and field mode and analyze each macroblock of a plurality of macroblocks based on macroblock pairs that include a top frame macroblock and bottom frame macroblock from a frame of the video input signal and a top field macroblock and a bottom field macroblock from a corresponding field of the video input signal. The neighbor data can include frame below neighbor data for retrieval by a neighboring macroblock in a row below the at least one macroblock when processing in frame mode and field below neighbor data for retrieval by the neighboring macroblock in a row below the at least one macroblock when processing in field mode. In addition, the neighbor data can include frame right neighbor data for retrieval by a neighboring macroblock to the right of the at least one macroblock when processing in frame mode and field right neighbor data for retrieval by the neighboring macroblock to the right of the at least one macroblock when processing in field mode.

In an embodiment, steps 400 and/or 402 generate at least one predicted motion vector for each macroblock of the plurality of macroblocks using retrieved neighbor data. Further, step 404 can generate at least one direct mode motion vector for each macroblock of the plurality of macroblocks using retrieved neighbor data. Also, step 406 can generate the best intra prediction mode for each macroblock of the plurality of macroblocks using retrieved neighbor data.

Figure 12:
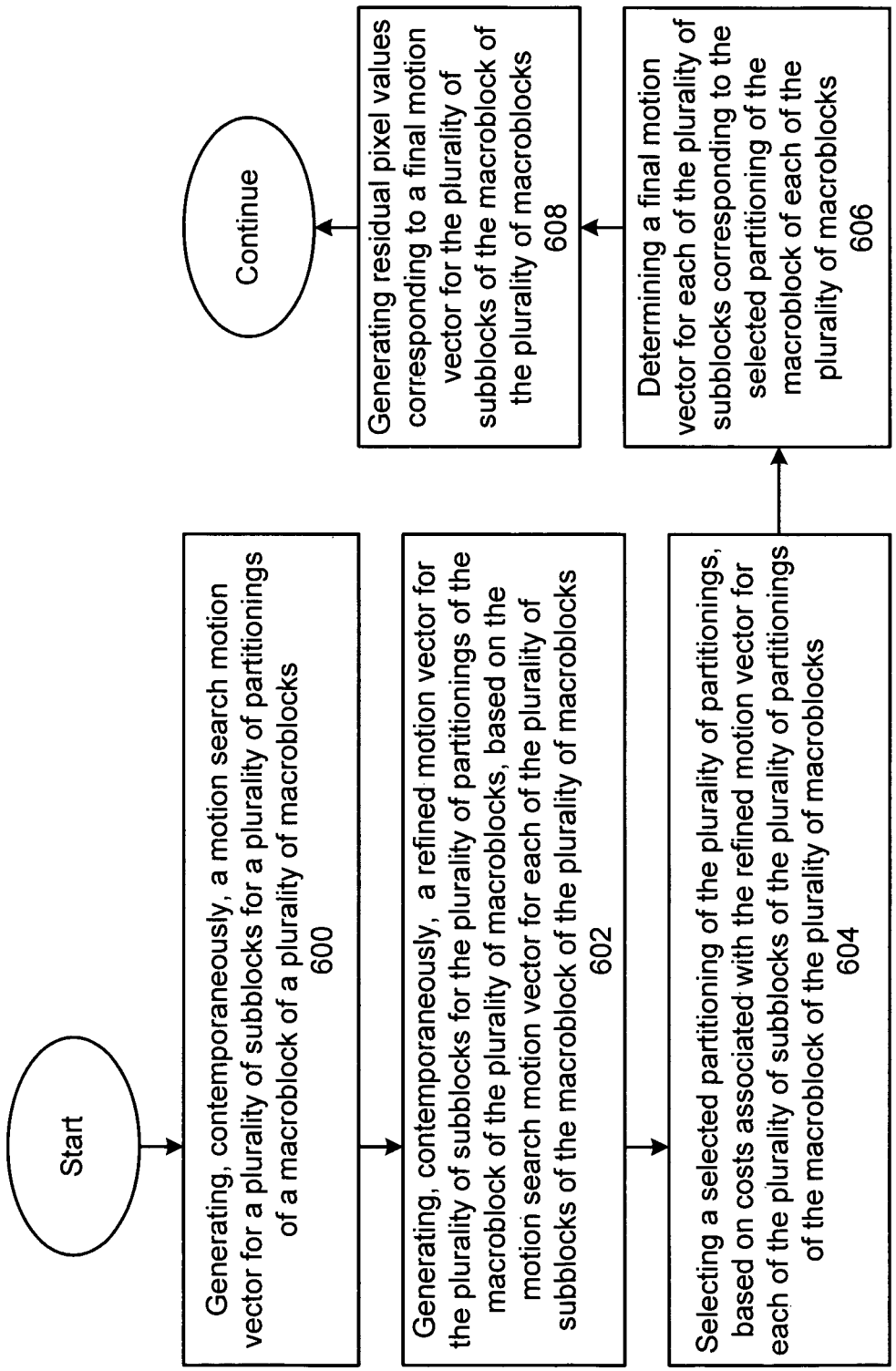
FIG. 12 presents a flowchart representation of a method in accordance with an embodiment of the present invention.

FIG. 12 presents a flowchart representation of a method in accordance with an embodiment of the present invention. In particular, a method is presented for use in conjunction with one or more of the features and functions described in association with FIGS. 1-11. In step 600, a motion search motion vector is contemporaneously generated for a plurality of subblocks for a plurality of partitionings of a macroblock of a plurality of macroblocks. In step 602, a refined motion vector is contemporaneously generated for the plurality of subblocks for the plurality of partitionings of the macroblock of the plurality of macroblocks, based on the motion search motion vector for each of the plurality of subblocks of the macroblock of the plurality of macroblocks. In step 604, a selected partitioning of the plurality of partitionings, is selected based on costs associated with the refined motion vector for each of the plurality of subblocks of the plurality of partitionings of the macroblock of the plurality of macroblocks. In step 606, a final motion vector is determined for each of the plurality of subblocks corresponding to the selected partitioning of the macroblock of the plurality of macroblocks. In step 608, residual pixel values are generated corresponding to a final motion vector for the plurality of subblocks of the macroblock of the plurality of macroblocks.

In an embodiment of the present invention steps 600 and 602 can operate in a plurality of selected modes including a first mode corresponding to a first compression standard, a second mode corresponding to a second compression standard and a third mode corresponding to a third compression standard. For example, in the first mode, steps 600 and 602 are capable of operating with macroblock adaptive frame and field enabled when a MBAFF signal is asserted and with MBAFF disabled when the MBAFF enable signal is deasserted, and wherein the plurality of partitionings are based on the MBAFF enable signal. The first compression standard can includes an H.264 standard, and when the MBAFF signal is asserted, the plurality of partitionings of the macroblock partition the macroblock into subblocks having a first minimum dimension. For example, when the MBAFF signal is asserted, the plurality of partitionings of the macroblock partition the macroblock into subblocks of sizes 16 pixels by 16 pixels, 16 pixels by 8 pixels, 8 pixels by 16 pixels, and 8 pixels by 8 pixels. In addition, when the MBAFF signal is deasserted, the plurality of partitionings of the macroblock partition the macroblock into subblocks having a second minimum dimension that is less than the first minimum dimension. For example, when the MBAFF signal is deasserted, the plurality of partitionings of the macroblock partition the macroblock into subblocks of sizes 16 pixels by 16 pixels, 16 pixels by 8 pixels, 8 pixels by 16 pixels, 8 pixels by 8 pixels, 4 pixels by 8 pixels, 8 pixels by 4 pixels, and 4 pixels by 4 pixels.

Further, in the second mode, such as when the second compression standard includes a Motion Picture Experts Group (MPEG) standard, the plurality of partitionings of the macroblock partition the macroblock into subblocks of sizes 16 pixels by 16 pixels, and 8 pixels by 8 pixels. Also, in the third mode, such as when the third compression standard includes a Society of Motion Picture and Television Engineers (SMPTE) standard, the plurality of partitionings of the macroblock partition the macroblock into subblocks of sizes 16 pixels by 16 pixels, and 8 pixels by 8 pixels.

Figure 13:
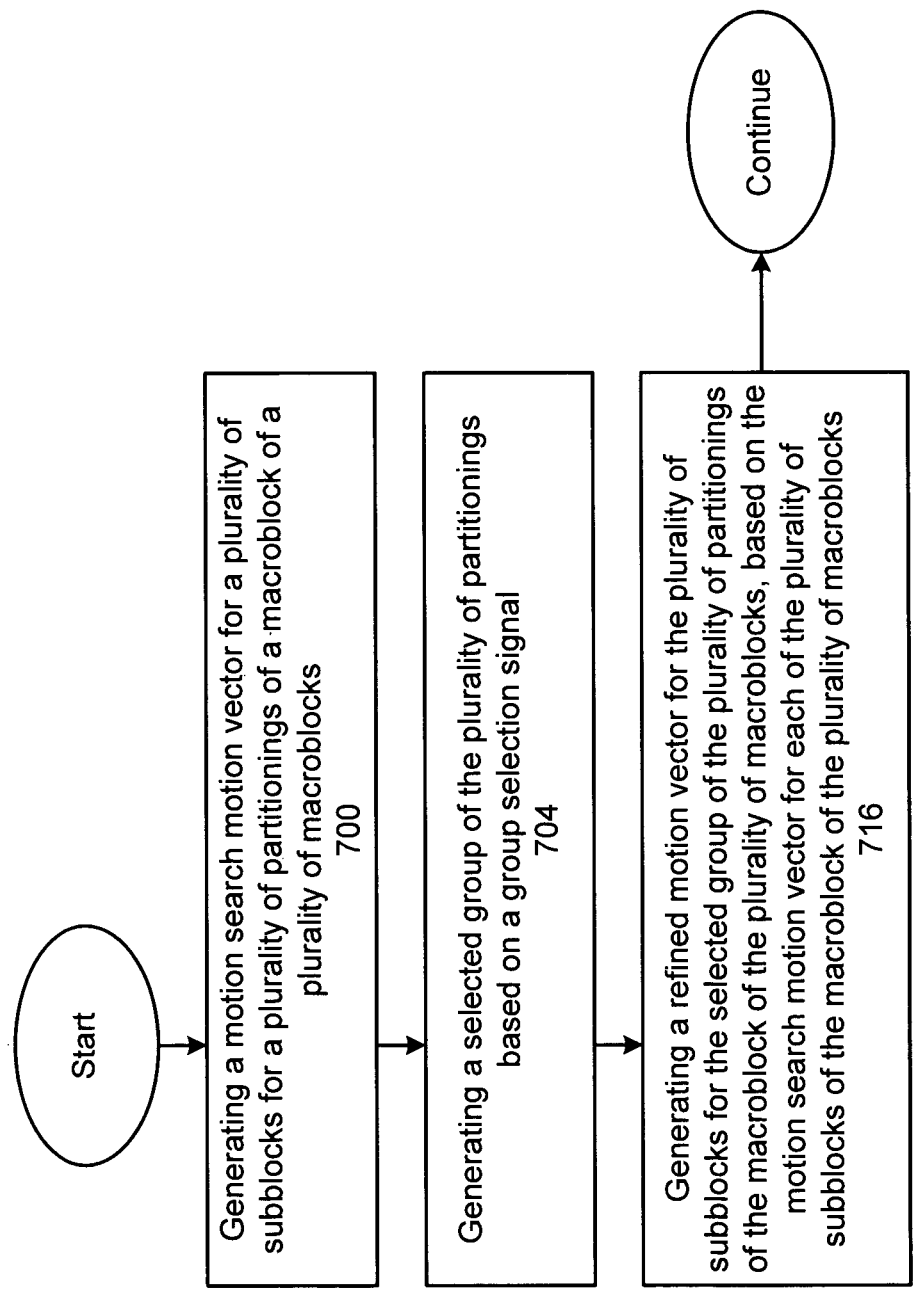
FIG. 13 presents a flowchart representation of a method in accordance with an embodiment of the present invention.

FIG. 13 presents a flowchart representation of a method in accordance with an embodiment of the present invention. In particular, a method is presented for use in conjunction with one or more of the features and functions described in association with FIGS. 1-12. In step 700 a motion search motion vector is generated for a plurality of subblocks for a plurality of partitionings of a macroblock of a plurality of macroblocks. In step 704, a selected group of the plurality of partitionings is generated, based on a group selection signal. In step 716, a refined motion vector is generated for the plurality of subblocks for the selected group of the plurality of partitionings of the macroblock of the plurality of macroblocks, based on the motion search motion vector for each of the plurality of subblocks of the macroblock of the plurality of macroblocks.

In an embodiment of the present invention, when the group selection signal has a first value, step 704 determines the selected group of the plurality of partitionings by comparing, for the plurality of partitionings of the macroblock of the plurality of macroblocks, the accumulated the costs associated with the motion search motion vector for each of the plurality of subblocks with a first threshold, and assigning the selected group to be a partitioning with the accumulated cost that compares favorably to the first threshold. When the group selection signal has a second value, step 704 determines the selected group of the plurality of partitionings by comparing, for the plurality of partitionings of the macroblock of the plurality of macroblocks, the accumulated the costs associated with the motion search motion vector for each of the plurality of subblocks, and assigning the selected group to be a selected partitioning with the most favorable accumulated cost. When the group selection signal has a third value, step 704 determines the selected group of the plurality of partitionings by comparing, for the plurality of partitionings of the macroblock of the plurality of macroblocks, the accumulated the costs associated with the motion search motion vector for each of the plurality of subblocks with a second threshold, and assigning the selected group to be each of partitionings of the plurality of partitionings with accumulated cost that compares favorably to the second threshold.

Optionally, step 700 contemporaneously generates the motion search motion vector for the plurality of subblocks for a plurality of partitionings of a macroblock of a plurality of macroblocks and step 716 contemporaneously generates the refined motion vector for the plurality of subblocks for the selected group of the plurality of partitionings of the macroblock of the plurality of macroblocks.

Figure 14:
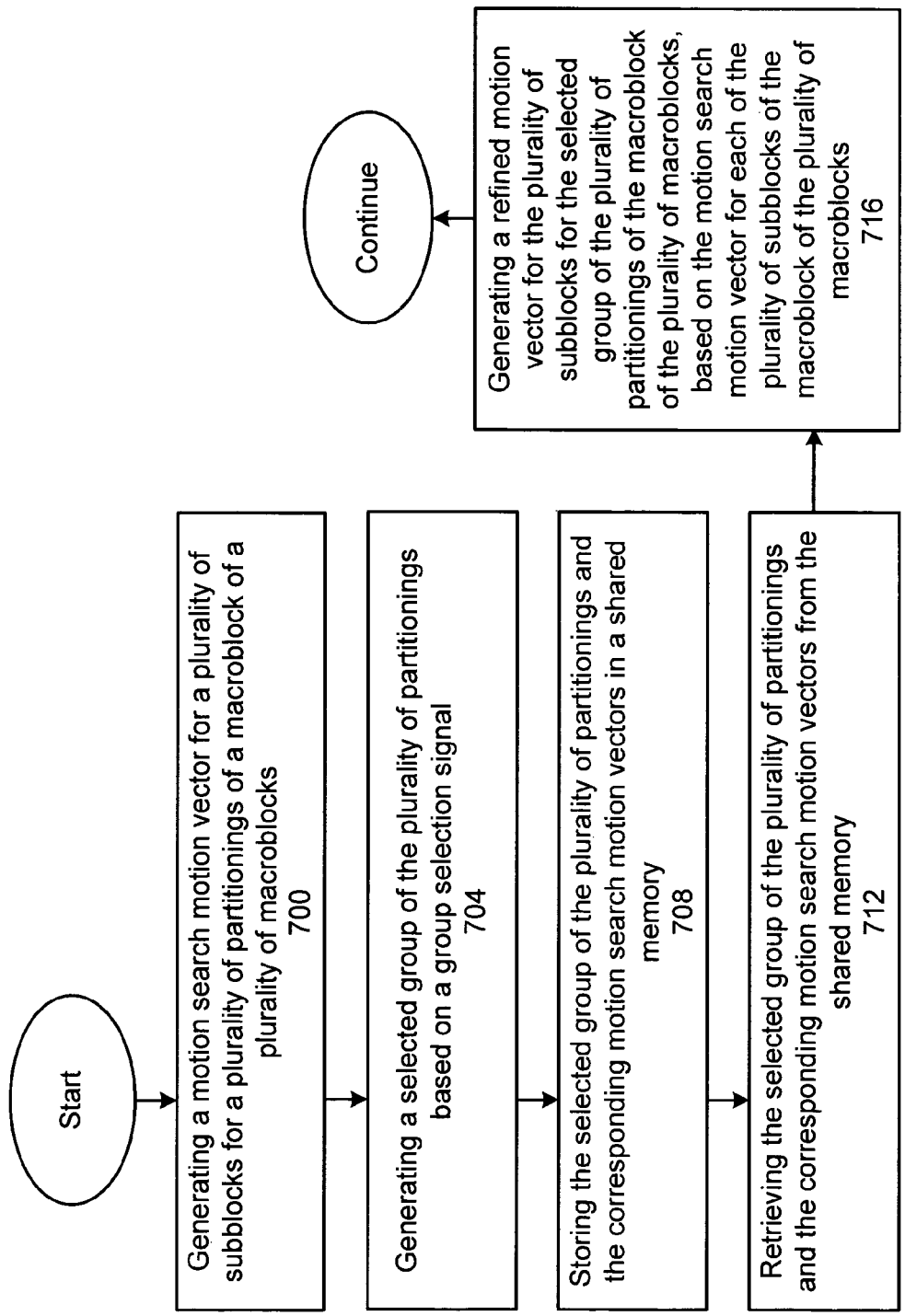
FIG. 14 presents a flowchart representation of a method in accordance with an embodiment of the present invention.

FIG. 14 presents a flowchart representation of a method in accordance with an embodiment of the present invention. A method is presented for use in conjunction with one or more of the features and functions described in association with FIGS. 1-12, and in particular that includes one or more elements of the method of FIG. 13 that are referred to by common reference numerals. In addition, this method includes step 708 of storing the selected group of the plurality of partitionings and the corresponding motion search motion vectors in a shared memory. Also, in step 712 the selected group of the plurality of partitionings and the corresponding motion search motion vectors are retrieved from the shared memory.

Figure 15:
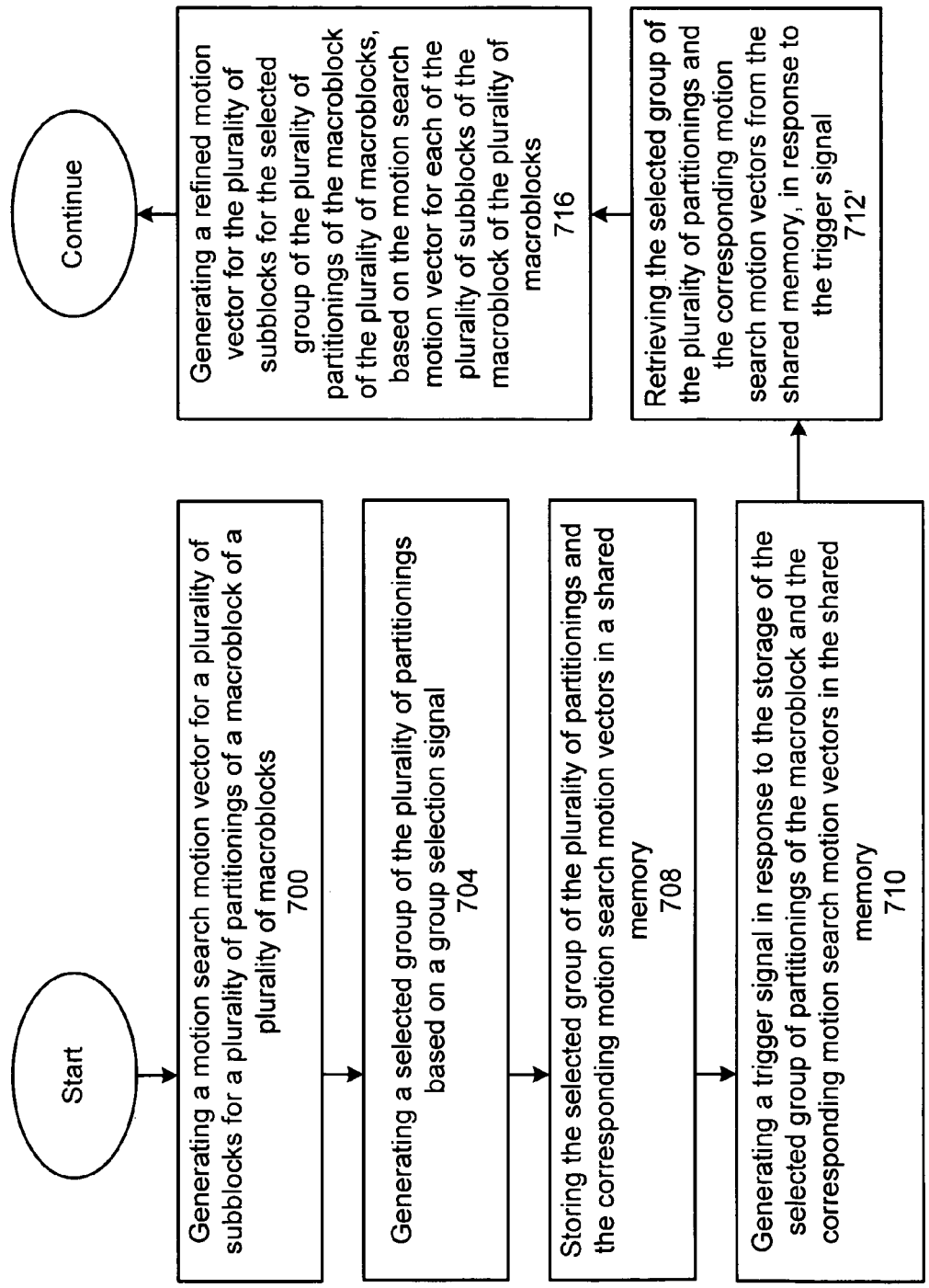
FIG. 15 presents a flowchart representation of a method in accordance with an embodiment of the present invention.

FIG. 15 presents a flowchart representation of a method in accordance with an embodiment of the present invention. A method is presented for use in conjunction with one or more of the features and functions described in association with FIGS. 1-12 and includes elements of the method of FIGS. 13 and 14 that are referred to by common reference numerals. In addition, the method includes step 710 that generates a trigger signal in response to the storage of the selected group of partitionings of the macroblock and the corresponding motion search motion vectors in the shared memory. In addition, step 712' includes retrieving the selected group of partitionings and the corresponding motion search motion vectors from the shared memory is performed in response to the trigger signal.

Figure 16:
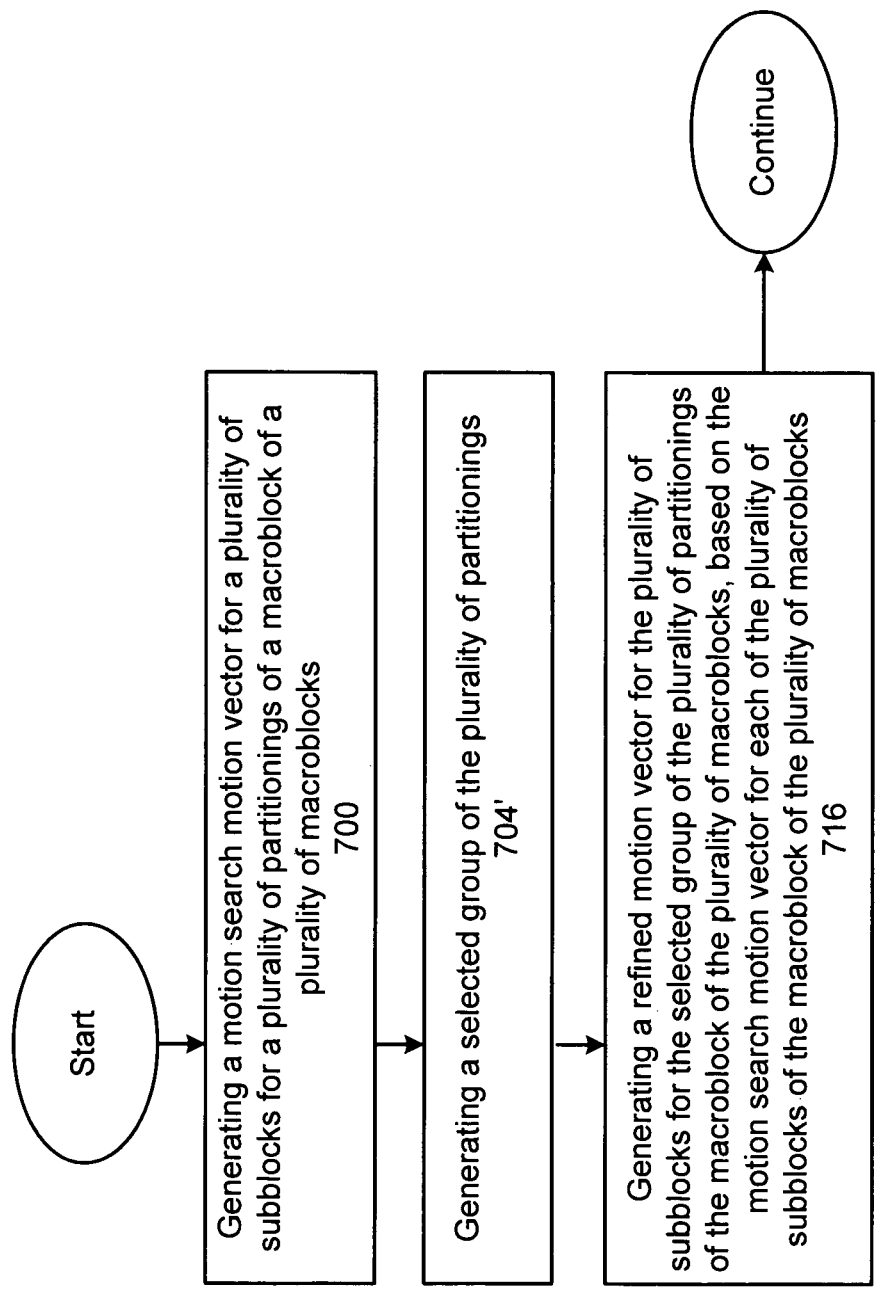
FIG. 16 presents a flowchart representation of a method in accordance with an embodiment of the present invention.

FIG. 16 presents a flowchart representation of a method in accordance with an embodiment of the present invention. A method is presented for use in conjunction with one or more of the features and functions described in association with FIGS. 1-15. In particular, a method is presented that can be used as an alternative to the method of claim 13 that includes common elements referred to by common reference numerals. In addition, the method includes a step 704' of generating a selected group of the plurality of partitionings.

Figure 17:
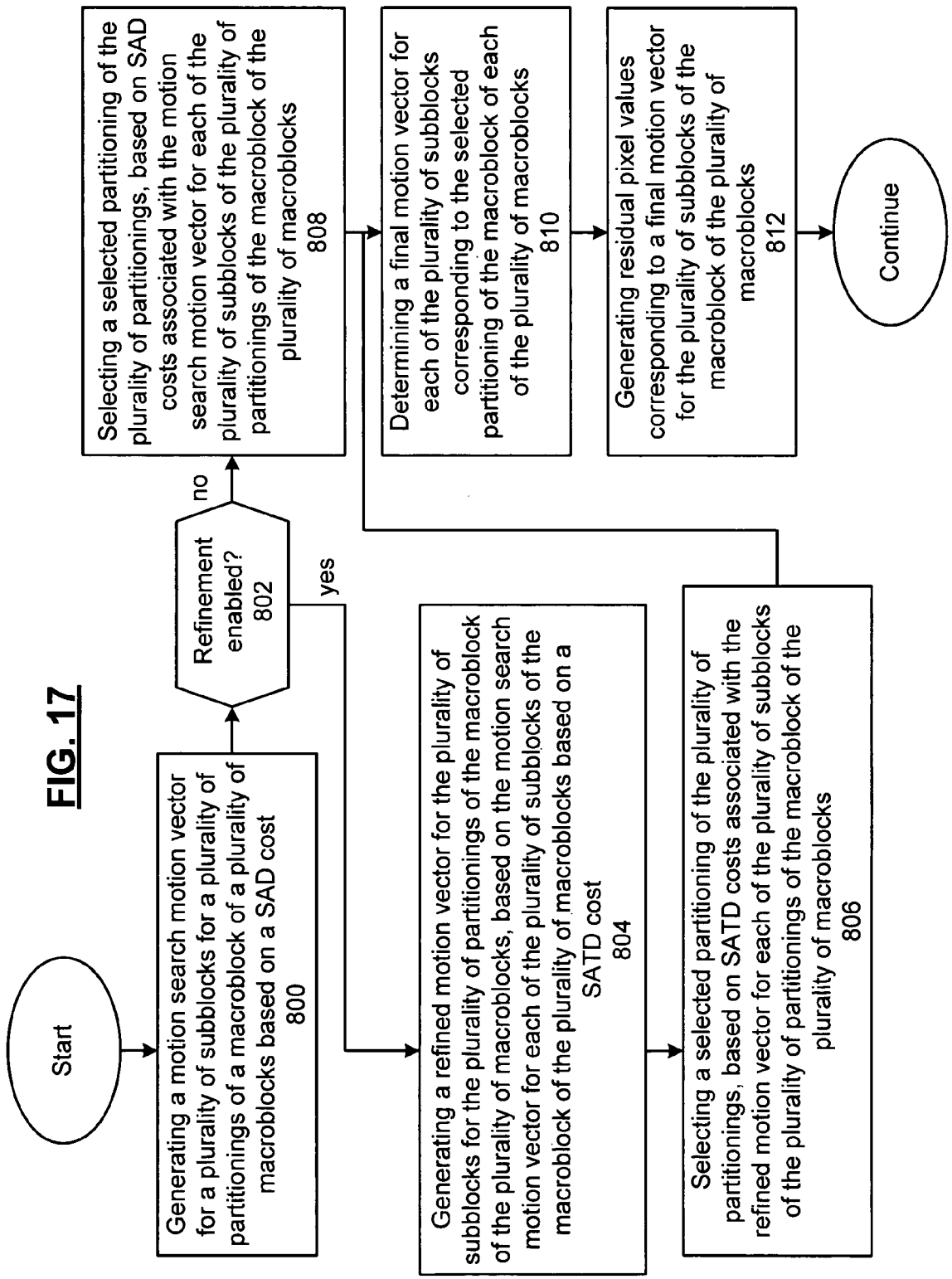
FIG. 17 presents a flowchart representation of a method in accordance with an embodiment of the present invention.

FIG. 17 presents a flowchart representation of a method in accordance with an embodiment of the present invention. In particular, a method is presented for use in conjunction with one or more of the features and functions described in association with FIGS. 1-16. In step 800, a motion search motion vector is generated for a plurality of subblocks for a plurality of partitionings of a macroblock of a plurality of macroblocks based on a sum of accumulated differences (SAD) cost. In step 802, the method determines if refinement is enabled. If so, the method proceeds to step 804 and generates a refined motion vector for the plurality of subblocks for the plurality of partitionings of the macroblock of the plurality of macroblocks, based on the motion search motion vector for each of the plurality of subblocks of the macroblock of the plurality of macroblocks and based on a sum of accumulated transform differences (SATD) cost. In step 806, a selected partitioning of the plurality of partitionings is selected, based on SATD costs associated with the refined motion vector for each of the plurality of subblocks of the plurality of partitionings of the macroblock of the plurality of macroblocks, when the step of generating a refined motion vector is enabled for the macroblock of the plurality of macroblocks.

If refinement is disabled, the method instead proceeds to step 808 where a selected partitioning of the plurality of partitionings is selected, based on SAD costs associated with the motion search motion vector for each of the plurality of subblocks of the plurality of partitionings of the macroblock of the plurality of macroblocks. In either case the method proceeds to step 810 where a final motion vector is determined for each of the plurality of subblocks corresponding to the selected partitioning of the macroblock of the plurality of macroblocks. In step 812, residual pixel values are generated corresponding to a final motion vector for the plurality of subblocks of the macroblock of the plurality of macroblocks.

In an embodiment of the present invention, refinement is selectively disabled based on a particular application, based on the particular compression standard, and/or based on a comparison of a total cost associated with at least one of the plurality of partitionings of the macroblock to a skip refinement cost threshold. It should be noted that refinement can be disabled on a macroblock by macroblock basis.

In addition, the method can operate in a plurality of selected modes including a first mode corresponding to a first compression standard, a second mode corresponding to a second compression standard and a third mode corresponding to a third compression standard, such as an H.264 standard, a Motion Picture Experts Group (MPEG) standard, a Society of Motion Picture and Television Engineers (SMPTE) standard or other standard.

FIG. 18 presents a flowchart representation of a method in accordance with an embodiment of the present invention. In particular, a method is presented for use in conjunction with the method described in association with FIG. 17. In step 820, one of a frame mode and a field mode is selected for the macroblock, based on SATD costs associated with the refined motion vector for each of the plurality of subblocks of the plurality of partitionings of the macroblock of the plurality of macroblocks, when the step of generating a refined motion vector is enabled for the macroblock of the plurality of macroblocks.

FIG. 19 presents a flowchart representation of a method in accordance with an embodiment of the present invention. In particular, a method is presented for use in conjunction with the method described in association with FIGS. 17 and 18. In step 830, one of the frame mode and the field mode is selected for the macroblock, based on SAD costs associated with the motion search motion vector for each of the plurality of subblocks of the plurality of partitionings of the macroblock of the plurality of macroblocks, when the step of generating a refined motion vector is disabled for the macroblock of the plurality of macroblocks.

In preferred embodiments, the various circuit components are implemented using 0.35 micron or smaller CMOS technology. Provided however that other circuit technologies, both integrated or non-integrated, may be used within the broad scope of the present invention.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video encoder and motion compensation module and motion refinement engine for use therewith. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A motion compensation module for use in a video encoder for encoding a video input signal that includes a sequence of images that are segmented into a plurality of macroblocks, the motion compensation module comprising:
    a shared memory;
    a motion search module, coupled to the shared memory, that generates a motion search motion vector for a plurality of subblocks for a plurality of partitionings of a macroblock of a plurality of macroblocks and generates a selected group of the plurality of partitionings and stores the selected group of partitionings and the corresponding motion search motion vectors in the shared memory; and
    a motion refinement module, coupled to the motion search module, that retrieves the selected group of partitionings and the corresponding motion search motion vectors from the shared memory, that generates a refined motion vector for the plurality of subblocks for the selected group of the plurality of partitionings of the macroblock of the plurality of macroblocks, based on the motion search motion vector for each of the plurality of subblocks of the macroblock of the plurality of macroblocks.

2. The motion compensation module of claim 1 wherein the motion search module generates a trigger signal in response to storage of the selected group of partitionings of the macroblock and the corresponding motion search motion vectors in the shared memory, and wherein the motion refinement module commences retrieval of the selected group of partitionings and the corresponding motion search motion vectors from the shared memory in response to the trigger signal.

3. The motion compensation module of claim 1 wherein, the motion search module determines the selected group of the plurality of partitionings based on accumulated costs associated with the motion search motion vector for each of the plurality of subblocks of the plurality of partitionings of the macroblock of the plurality of macroblocks.

4. The motion compensation module of claim 3 wherein, the motion search module determines the selected group of the plurality of partitionings by comparing, for the plurality of partitionings of the macroblock of the plurality of macroblocks, the accumulated costs associated with the motion search motion vector for each of the plurality of subblocks with a first threshold, and assigning the selected group to be a partitioning with the accumulated costs that compares favorably to the first threshold.

5. The motion compensation module of claim 3 wherein, the motion search module determines the selected group of the plurality of partitionings by comparing, for the plurality of partitionings of the macroblock of the plurality of macroblocks, the accumulated costs associated with the motion search motion vector for each of the plurality of subblocks, and assigning the selected group to be a selected partitioning with the most favorable accumulated cost.

6. The motion compensation module of claim 3 wherein, the motion search module determines the selected group of the plurality of partitionings by comparing, for the plurality of partitionings of the macroblock of the plurality of macroblocks, the accumulated costs associated with the motion search motion vector for each of the plurality of subblocks with a second threshold, and assigning the selected group to be each of partitionings of the plurality of partitionings with accumulated cost that compares favorably to the second threshold.

7. The motion compensation module of claim 1 wherein the motion search module contemporaneously generates the motion search motion vector for the plurality of subblocks for a plurality of partitionings of a macroblock of a plurality of macroblocks.

8. The motion compensation module of claim 1 wherein the motion refinement module contemporaneously generates the refined motion vector for the plurality of subblocks for the selected group of the plurality of partitionings of the macroblock of the plurality of macroblocks.

9. A method for use in a video encoder for encoding a video input signal that includes a sequence of images that are segmented into a plurality of macroblocks, the method comprising:

generating a motion search motion vector for a plurality of subblocks for a plurality of partitionings of a macroblock of a plurality of macroblocks;

generating a selected group of the plurality of partitionings based on a group selection signal;

storing the selected group of the plurality of partitionings and the corresponding motion search motion vectors in a shared memory;

retrieving the selected group of the plurality of partitionings and the corresponding motion search motion vectors from the shared memory; and generating a refined motion vector for the plurality of subblocks for the selected group of the plurality of partitionings of the macroblock of the plurality of macroblocks, based on the motion search motion vector for each of the plurality of subblocks of the macroblock of the plurality of macroblocks.

10. The method of claim 9 further comprising:

generating a trigger signal in response to storage of the selected group of partitionings of the macroblock and the corresponding motion search motion vectors in the shared memory, and wherein the step of retrieving the selected group of partitionings and the corresponding motion search motion vectors from the shared memory is performed in response to the trigger signal.

11. The method of claim 9 wherein, when the group selection signal has a first value, the step of generating the selected group of the plurality of partitionings determines the selected group of the plurality of partitionings by comparing, for the plurality of partitionings of the macroblock of the plurality of macroblocks, accumulated costs associated with the motion search motion vector for each of the plurality of subblocks with a first threshold; and assigning the selected group to be a partitioning with the accumulated costs that compares favorably to the first threshold.

12. The method of claim 11 wherein, when the group selection signal has a second value, the step of generating the selected group of the plurality of partitionings determines the selected group of the plurality of partitionings by comparing, for the plurality of partitionings of the macroblock of the plurality of macroblocks, the accumulated the costs associated with the motion search motion vector for each of the plurality of subblocks, and assigning the selected group to be a selected partitioning with the most favorable accumulated cost.

13. The method of claim 9 wherein, when the group selection signal has a third value, the step of generating the selected group of the plurality of partitionings determines the selected group of the plurality of partitionings by comparing, for the plurality of partitionings of the macroblock of the plurality of macroblocks, the accumulated costs associated with the motion search motion vector for each of the plurality of subblocks with a second threshold, and assigning the selected group to be each of partitionings of the plurality of partitionings with accumulated cost that compares favorably to the second threshold.

14. The method of claim 9 wherein the step of generating the motion search motion vector contemporaneously generates the motion search motion vector for the plurality of subblocks for a plurality of partitionings of a macroblock of a plurality of macroblocks.

15. The method of claim 9 wherein the step of generating the refined motion vector contemporaneously generates the refined motion vector for the plurality of subblocks for the selected group of the plurality of partitionings of the macroblock of the plurality of macroblocks.

* * * * *